US011022215B2

(12) United States Patent
Daiyakuji et al.

(10) Patent No.: US 11,022,215 B2
(45) Date of Patent: Jun. 1, 2021

(54) WORK VEHICLE

(71) Applicant: YANMAR CO., LTD., Osaka (JP)

(72) Inventors: Taihei Daiyakuji, Osaka (JP); Hitoshi Nomura, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/746,169

(22) Filed: Jan. 17, 2020

(65) Prior Publication Data

US 2020/0149632 A1  May 14, 2020

Related U.S. Application Data

(63) Continuation of application No. 15/751,112, filed as application No. PCT/JP2016/003632 on Aug. 5, 2016, now Pat. No. 10,563,761.

(30) Foreign Application Priority Data

Aug. 7, 2015 (JP) .............................. JP2015-157471
Aug. 7, 2015 (JP) .............................. JP2015-157473

(Continued)

(51) Int. Cl.
*F16H 61/438* (2010.01)
*F16H 61/435* (2010.01)
(Continued)

(52) U.S. Cl.
CPC ........... *F16H 61/438* (2013.01); *F16H 47/02* (2013.01); *F16H 61/425* (2013.01); *F16H 61/435* (2013.01); *F16H 61/439* (2013.01)

(58) Field of Classification Search
CPC .... F16H 61/438; F16H 61/435; F16H 61/439; F16H 2061/005
See application file for complete search history.

(56) References Cited

U.S. PATENT DOCUMENTS 6,425,244 B1 * 7/2002 Ohashi ................. F04B 1/2064
60/464
6,672,843 B1 * 1/2004 Holder ..................... F04B 1/22
417/201

(Continued)

FOREIGN PATENT DOCUMENTS

JP   H11-078574 A   3/1999
JP   H11-082642 A   3/1999

(Continued)

OTHER PUBLICATIONS

Japanese Office Action dated Oct. 31, 2018 issued in corresponding JP Application 2015-157473 cites the patents documents above.

(Continued)

*Primary Examiner* — Thomas E Lazo
(74) *Attorney, Agent, or Firm* — Norton Rose Fulbright Us LLP

(57) ABSTRACT

A work vehicle such as a tractor including an engine, a battery, a hydraulic continuously variable transmission, and an electric cylinder, and a power transmission mechanism. The hydraulic continuously variable transmission changes an output of the engine, and changes an angle of a movable swash plate to change a gear ratio thereof. The electric cylinder is driven by electric power supplied from the battery at least while the engine is stopped. With the power generated in the electric cylinder and transmitted, the power transmission mechanism changes the angle of the movable swash plate of the hydraulic continuously variable transmission.

20 Claims, 25 Drawing Sheets

(30) Foreign Application Priority Data

Aug. 7, 2015 (JP) .............................. JP2015-157476
Aug. 7, 2015 (JP) .............................. JP2015-157478

(51) Int. Cl.
*F16H 61/439* (2010.01)
*F16H 47/02* (2006.01)
*F16H 61/425* (2010.01)

(56) References Cited

U.S. PATENT DOCUMENTS

| | | | | |
|---|---|---|---|---|
| 7,165,398 | B1* | 1/2007 | Holder | F16D 31/02 60/487 |
| 7,229,256 | B1* | 6/2007 | Hauser | F04B 1/2064 417/269 |
| 7,281,375 | B1* | 10/2007 | Holder | F16H 61/435 60/487 |
| 7,377,106 | B2* | 5/2008 | Sakikawa | F04B 1/22 60/484 |
| 7,458,311 | B2* | 12/2008 | Korthals | F16D 31/02 60/328 |
| 7,841,430 | B2* | 11/2010 | Shiba | B60K 17/28 180/53.4 |
| 7,908,960 | B2* | 3/2011 | Daigre | F16H 61/435 92/12.2 |
| 7,988,582 | B1* | 8/2011 | Hauser | B60W 10/11 475/224 |
| 8,001,883 | B1* | 8/2011 | Langenfeld | F16H 61/439 92/12.2 |
| 8,074,451 | B2* | 12/2011 | Kuras | F16H 63/062 60/487 |
| 8,511,216 | B2* | 8/2013 | Sasahara | F04B 1/295 91/505 |
| 9,765,870 | B1* | 9/2017 | Fox | F16H 35/10 |
| 2003/0188909 | A1* | 10/2003 | Ohashi | B60K 25/00 180/300 |
| 2006/0272495 | A1* | 12/2006 | Ohashi | F04B 17/05 91/472 |
| 2011/0088545 | A1* | 4/2011 | Sasahara | F04B 1/20 91/505 |
| 2012/0198994 | A1* | 8/2012 | Choi | F04B 1/324 91/506 |

FOREIGN PATENT DOCUMENTS

| | | |
|---|---|---|
| JP | H11-173413 A | 6/1999 |
| JP | 2000-142457 A | 5/2000 |
| JP | 2003-247643 A | 9/2003 |
| JP | 2004-210215 A | 7/2004 |
| JP | 2005-153690 A | 6/2005 |
| JP | 2007-224943 A | 9/2007 |
| JP | 2007-298050 A | 11/2007 |
| JP | 2008-179198 A | 8/2008 |
| JP | 2008-273249 A | 11/2008 |
| JP | 2009-138895 A | 6/2009 |
| JP | 2010-203572 A | 9/2010 |

OTHER PUBLICATIONS

Japanese Notice of Allowance dated Dec. 28, 2018 issued in corresponding JP Application 2015-157473 cites the patents documents above.
Japanese Notice of Allowance dated Oct. 30, 2018 issued in corresponding JP Application 2015-157476 cites the patents documents above.
Japanese Office Action dated Oct. 30, 2018 issued in corresponding JP Application 2015-157478 cites the patents documents above.
European Search Report dated Mar. 13, 2019 issued in corresponding EP Application 16834818.3 cites the patents documents above.
International Search Report dated Nov. 1, 2016 issued in corresponding PCT Application PCT/JP2016/003632 cites the patents documents above.
Japanese Decision of Dismissal of Amendment dated Nov. 29, 2019 issued in corresponding JP Application 2015-157471 cites the patent document above.

* cited by examiner

WORK VEHICLE

CROSS REFERENCE TO RELATED APPLICATIONS

This application is a continuation from U.S. application Ser. No. 15/751,112 filed Feb. 7, 0218, which is a national stage application pursuant to 35 U.S.C. § 371 of International Application No. PCT/JP2016/003632, filed on Aug. 5, 2016, which claims priority under 35 U.S.C. § 119 to Japanese Patent Application Nos. 2015-157471, 2015-157473, 2015-157476, and 2015-157478, all filed on Aug. 7, 2015, the disclosures of which are hereby incorporated by reference in their entireties.

DESCRIPTION

Technical Field

The present invention mainly relates to a work vehicle including a hydraulic continuously variable transmission.

Background Art

Traditionally, there has been known a work vehicle such as a tractor having a structure including a hydraulic continuously variable transmission for smooth traveling in a field. Patent Literatures 1 and 2 (hereinafter referred to as PTL 1 and PTL 2, respectively) each discloses a work vehicle (tractor) having such a hydraulic continuously variable transmission.

The tractor disclosed in PTL 1 includes a hydraulic continuously variable transmission having a hydraulic pump and a hydraulic motor. The hydraulic pump is driven by a power of the engine to generate hydraulic pressure. The hydraulic motor converts the hydraulic pressure generated by the hydraulic pump into rotational force. Further, the hydraulic pump has a movable swash plate, and by changing a working fluid delivery rate according to the inclination angle of the movable swash plate, speed can be changed.

Further, the tractor of the PTL 1 has a gear shift lever for instructing a target speed. When the gear shift lever is operated by an operator, the expansion/contraction amount of a hydraulic cylinder changes according to the lever position. This way, the inclination angle of the movable swash plate can be changed according to the speed instructed by the operator.

The tractor of PTL 2 includes a reverser lever. By operating the reverser lever, the operator can instruct advance, reverse, and neutral. When the reverser lever is operated by the operator, a gear shift actuator is driven according to the lever position, thereby changing the inclination angle of the movable swash plate. For example, when the operator instructs neutral by operating the reverser lever, the inclination angle of the movable swash plate (delivery rate of the hydraulic pump) is changed so that the power of the engine is not transmitted to the output shaft of the hydraulic continuously variable transmission. It should be noted that PTL 2 does not disclose a specific structure of the gear shift actuator.

CITATION LIST

PTL 1: Japanese Unexamined Patent Application Publication No. 2008-179198

PTL 2: Japanese Unexamined Patent Application Publication No. 2007-298050

SUMMARY OF INVENTION

In the work vehicle of PTL 1 in which the inclination angle of the movable swash plate is changed by the hydraulic cylinder, the inclination angle of the movable swash plate cannot be changed while the engine is stopped, because the hydraulic cylinder cannot be driven. Therefore, for example, when the engine abruptly stops while advancing, the movable swash plate stops at the inclination angle (in a state where the power of the engine is transmitted to the output shaft of the hydraulic continuously variable transmission) and cannot be brought back to neutral.

Therefore, the power of the engine is transmitted to the output shaft of the hydraulic continuously variable transmission, upon restarting the engine thereafter. As a result, for example, the work vehicle may slightly move and may bewilder the operator.

In view of the above, the present invention is made, and it is a main object of the present invention to provide a structure in a work vehicle having a hydraulic continuously variable transmission, which is configured to prevent an output of the hydraulic continuously variable transmission from being generated when an engine is restarted, even if the engine is stopped with the hydraulic continuously variable transmission in a non-neutral state.

Problems to be solved by the invention are as described above, and next, means for solving the problems and effects thereof will be described.

In an aspect of the present invention, a work vehicle having the following configuration is provided. Namely, the work vehicle includes an engine, a battery, a hydraulic continuously variable transmission, an electric actuator, and a power transmission mechanism. The hydraulic continuously variable transmission changes an output of the engine, and changes an inclination angle of a movable swash plate to change a gear ratio. The electric actuator is driven by electric power supplied from the battery at least while the engine is stopped. The power transmission mechanism changes the inclination angle of the movable swash plate of the hydraulic continuously variable transmission, by transmitting power generated by the electric actuator.

With this, the inclination angle of the movable swash plate of the hydraulic continuously variable transmission can be changed even while the engine is stopped. Therefore, for example even when the engine abruptly stops, the hydraulic continuously variable transmission can be changed back to neutral, by for example, changing the inclination angle of the movable swash plate. Thus, an output of the hydraulic continuously variable transmission can be prevented from being generated immediately after the engine is restarted.

The above-described work vehicle may be preferably adapted as follows. That is, an inclination angle detection unit configured to detect the inclination angle of the movable swash plate is provided. The inclination angle detection unit detects the inclination angle of the movable swash plate, by receiving electric power supplied from the battery while the engine is stopped.

With this, the inclination angle of the movable swash plate can be accurately grasped even while the engine is stopped. Therefore, for example, the hydraulic continuously variable transmission can be accurately changed back to neutral while the engine is stopped.

The above-described work vehicle may be preferably adapted as follows. That is, the work vehicle includes a switching operation detection unit and a switch operation detection unit. The switch operation unit is capable of performing at least an operation of switching the hydraulic continuously variable transmission to neutral. The switching operation detection unit detects an operation performed by the switch operation unit. When the switching operation detection unit detects that an operation of switching to neutral is performed by the switch operation unit while the engine is stopped, the electric actuator changes the inclination angle of the movable swash plate so that the hydraulic continuously variable transmission is neutral.

This way, the hydraulic continuously variable transmission can be changed back to neutral even while the engine is stopped, with the same operation as the one while the engine is running.

BRIEF DESCRIPTION OF DRAWINGS

FIG. 6 A left side view showing a positional relationship of the transmission case, a rear axle, the electric cylinder, and the like.

DESCRIPTION OF EMBODIMENTS

Figure 1:
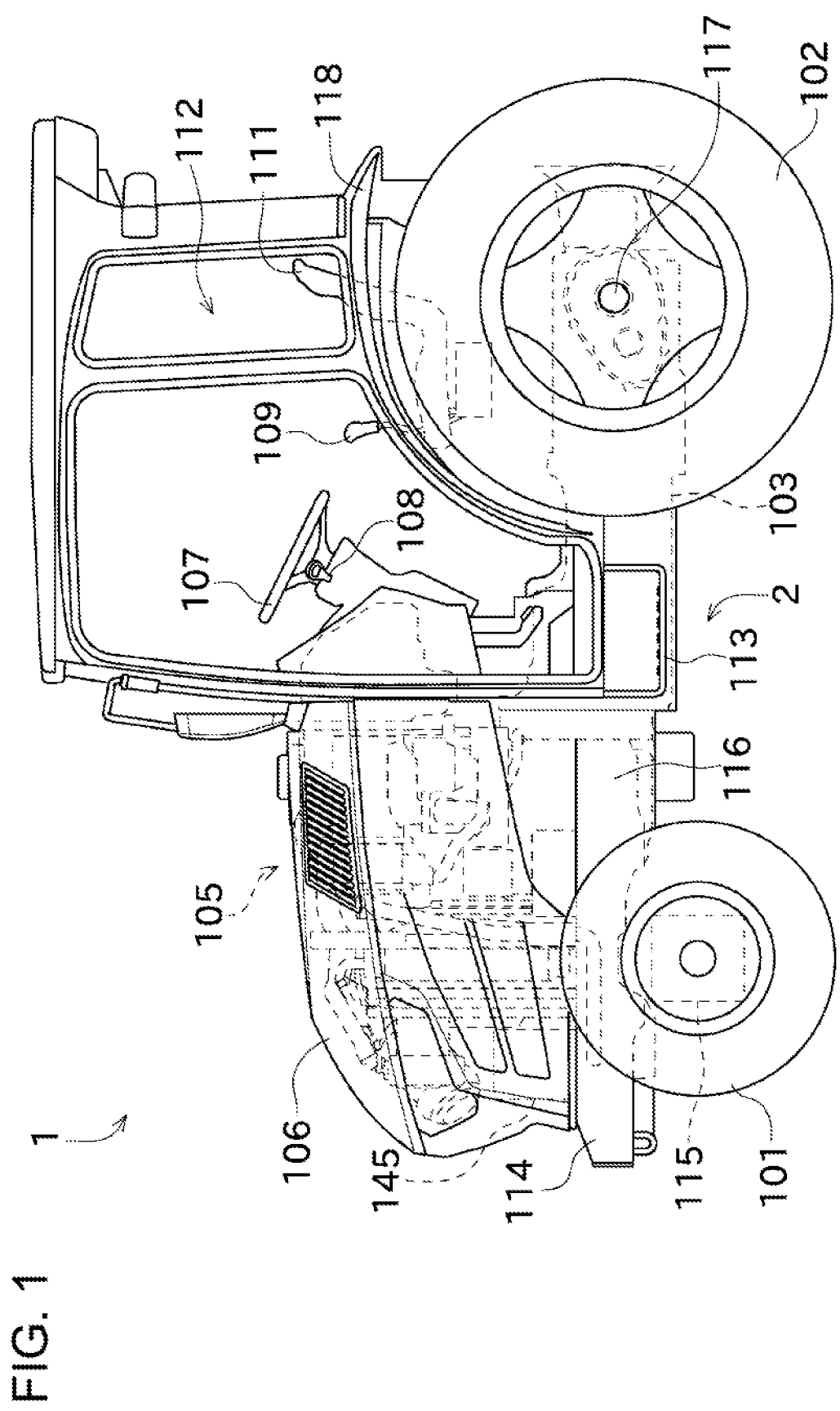
FIG. 1 A right side view showing an overall structure of a tractor related to one embodiment of the present invention.
Figure 2:
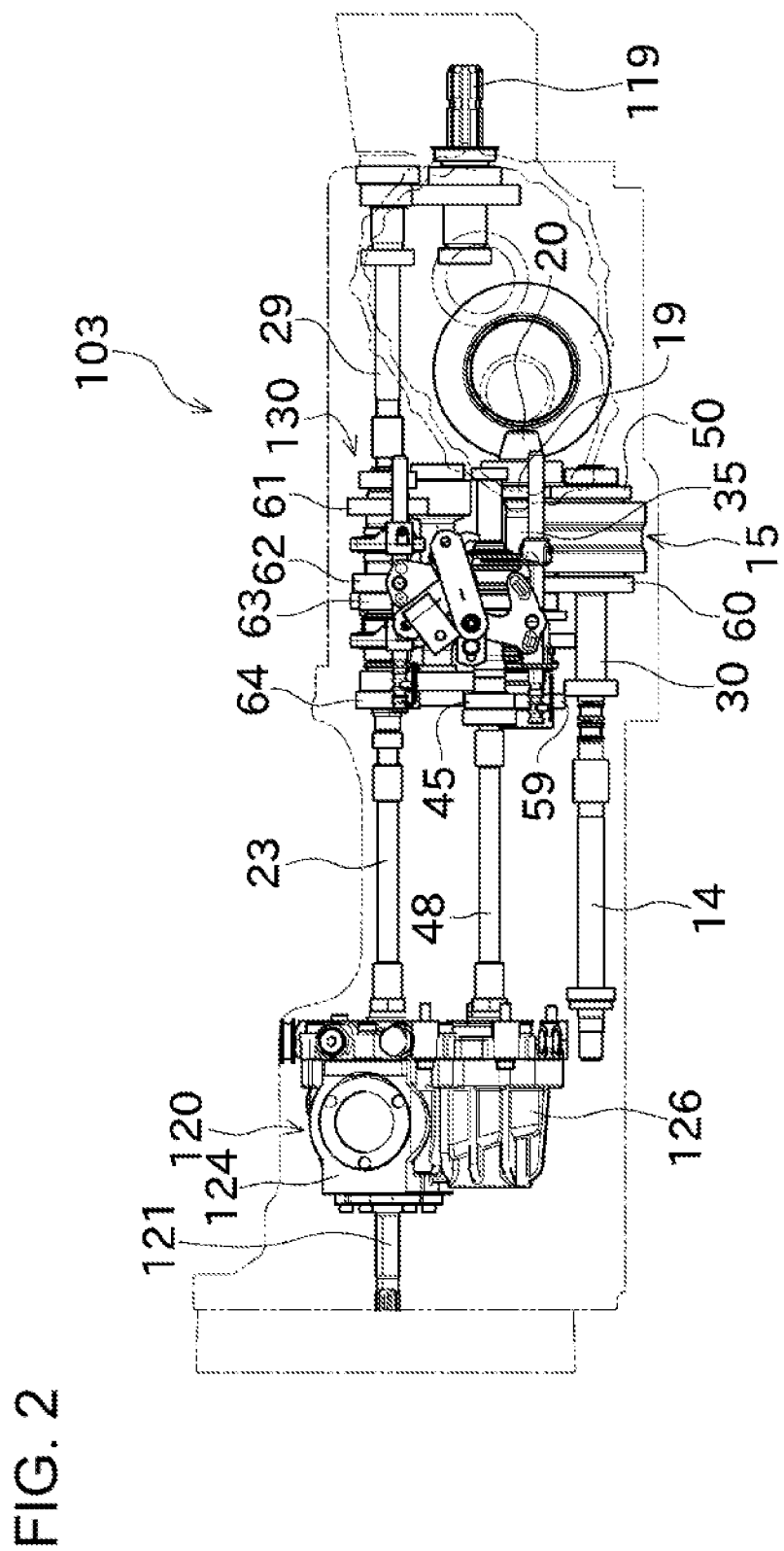
FIG. 2 A right side view showing a structure inside a transmission case provided in the tractor.
Figure 3:
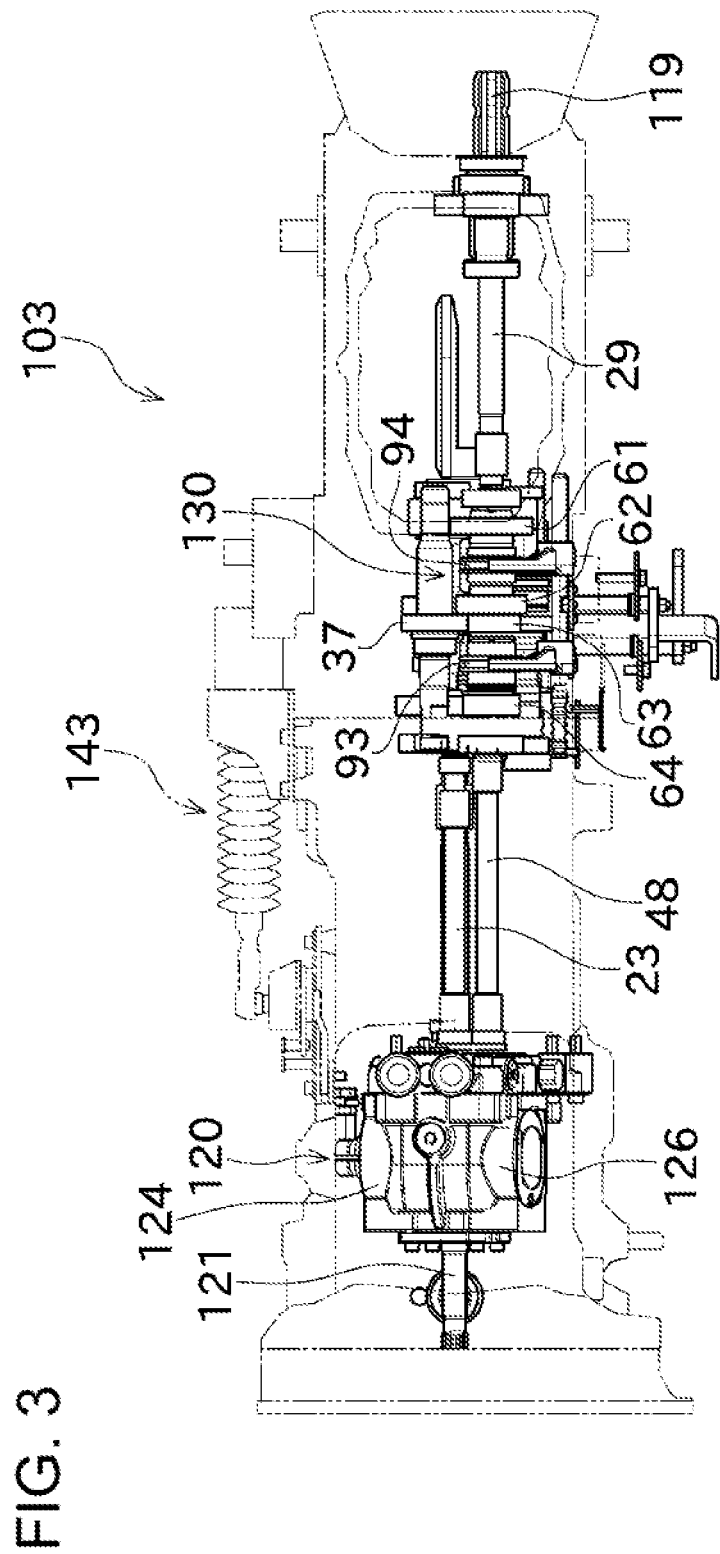
FIG. 3 A plan view showing a structure of the transmission case.
Figure 4:
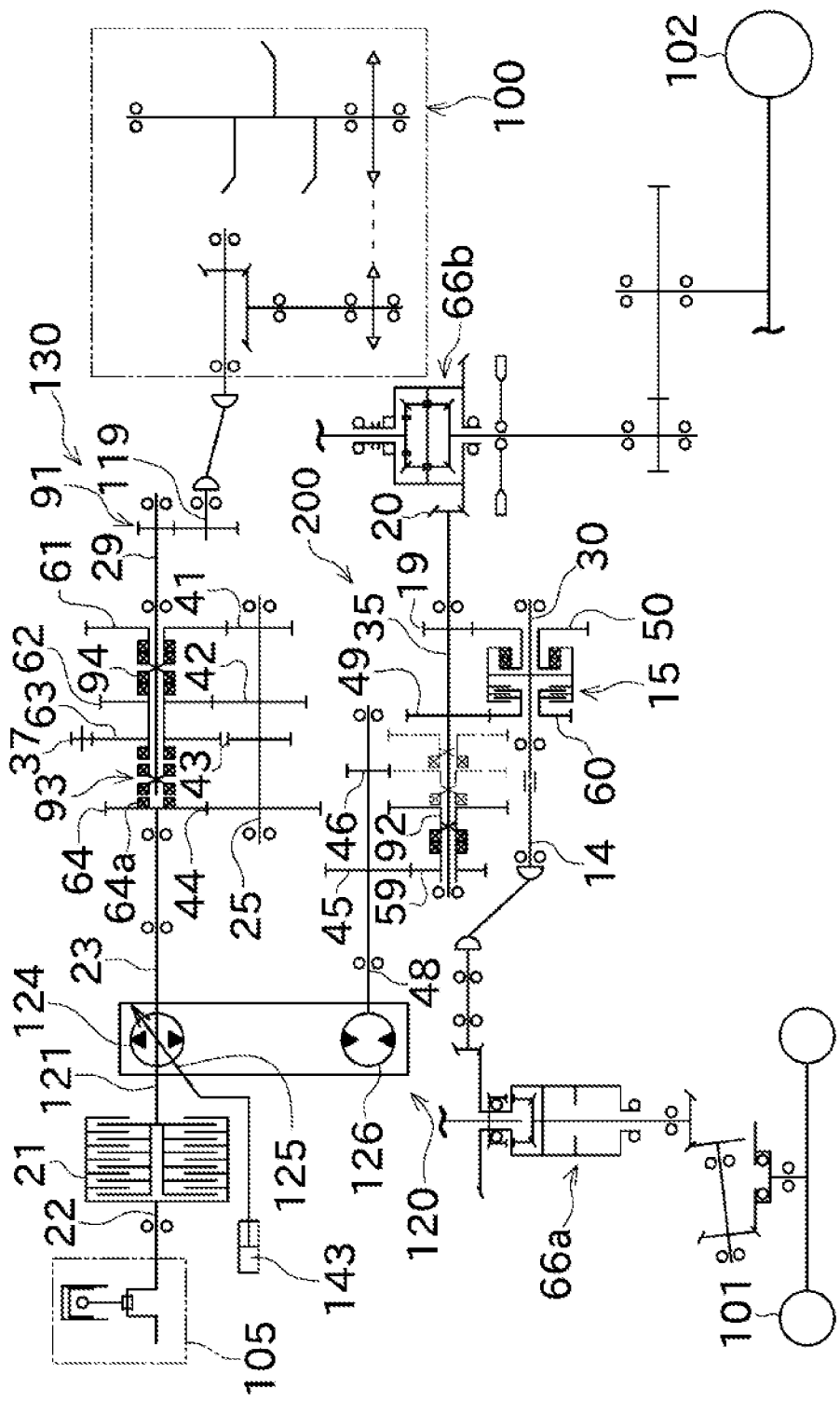
FIG. 4 A power transmission diagram of the tractor.

An embodiment of the present invention will be described with reference to the drawings. FIG. 1 is a right side view showing an overall structure of a tractor 1 related to one embodiment of the present invention. FIG. 2 is a right side view showing a structure inside a transmission case 103 provided in the tractor 1. FIG. 3 is a plan view showing a structure of the transmission case 103. FIG. 4 is a power transmission diagram of the tractor 1. In the following description, the wordings "left", "right", and the like mean the left and the right in the direction in which the tractor 1 moves forward, respectively.

FIG. 1 shows the tractor 1 as a work vehicle of the present embodiment. A body 2 of the tractor 1 is supported by a pair of left and right front wheels 101, 101 and a pair of left and right rear wheels 102, 102, each of which wheel serves as a running wheel. Inside an engine hood 106 at the front part of the body 2, an engine 105 serving as a drive source is disposed. The engine 105 is structured as a diesel engine, and functions as a drive source of the tractor 1. It should be noted however that the structure of the engine 105 is not limited to the above, and may be structured as a gasoline engine, for example.

On the top surface of the body 2, a cabin 112 is disposed behind the engine hood 106. Inside the cabin 112, a seat 111 on which an operator is seated is disposed. Around the seat 111, a steering wheel 107, a reverser lever (switch operation unit) 108, and a main shift lever 109 are provided. By operating the reverser lever 108, the operator can switch between advance and reverse, or instruct neutral (a state of not transmitting power generated by the engine 105 to the running wheels). The main shift lever 109 is a lever for switching the vehicle speed. Further, for example, a sub shift lever, a clutch pedal, a PTO shift lever, and the like are provided as other operation tools. The seat 111 and the above-described operation tools and the like are disposed in a driver unit formed in the cabin 112.

Steps 113, 113 by which an operator gets on and off is provided on left and right outer sides of the cabin 112. A not-shown fuel tank for supplying a fuel to the engine 105 is disposed in front of the cabin 112, and the fuel tank is accommodated in the engine hood 106.

A frame structuring the body 2 is structured by a not-shown engine frame having a front bumper 114 and a front axle case 115, and left and right body frames 116, 116 detachably fixed to a rear portion of the engine frame. In a rear portion of the body frames 116, a transmission case 103 is connected. The transmission case 103 has therein a mechanism for suitably converting rotary power from the engine 105 and transmitting the rotary power to the four wheels. The rear wheels 102 are attached to the transmission case 103 via the rear axle 117. The above of the right and left rear wheels 102 is covered with right and left rear fenders 118.

Behind the engine 105, a not-shown clutch housing is disposed, and the above-described transmission case 103 is disposed behind the clutch housing. This way, a drive force from the engine 105 can be transmitted to and drive the rear wheels 102 while changing the speed. Further, the tractor 1 includes a later-described two-wheel/four-wheel drive switching mechanism 15, and is capable of transmitting the output from the transmission case 103 not only to the rear wheels 102 but also to the front wheels 101.

The drive force of the engine 105 is transmitted to a PTO shaft 119 protruding from the rear end of the transmission case 103. The tractor 1 has a work machine mounting device, and is structured so that a work machine 100 shown in FIG. 4 can be attached to the rear end of the tractor 1. For example, as the work machine 100, plows, loaders and the like can be cited as examples. The PTO shaft 119 can drive the work machine 100 through a not-shown universal joint and the like.

Figure 5:
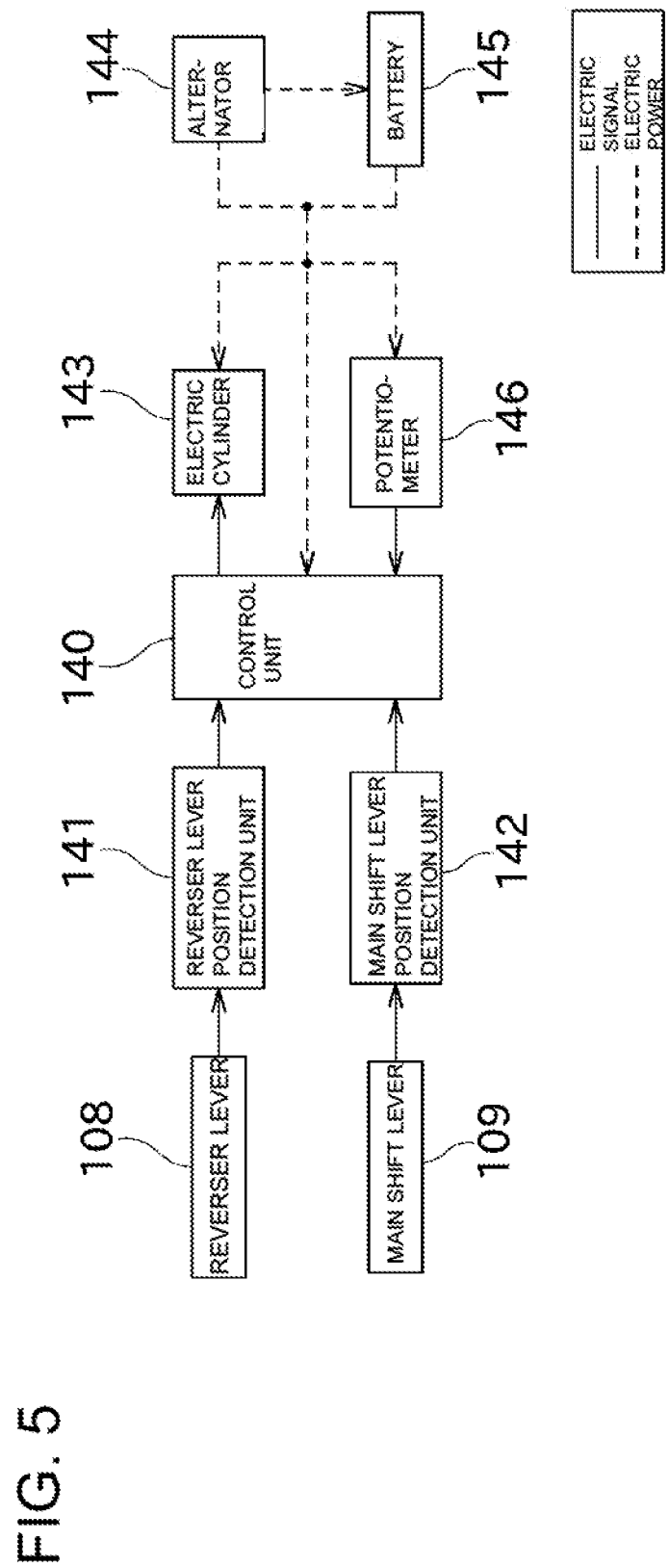
FIG. 5 A block diagram explaining an electrical structure for driving an electric cylinder.

In addition, the drive force of the engine 105 is also transmitted to an alternator 144 shown in FIG. 5. The alternator 144 generates electric power using the drive force of the engine 105, and supplies electric power to electric devices in the tractor 1. Further, the tractor 1 is provided with a battery 145 inside the engine hood 106. The battery 145 is charged by the alternator 144. For example, the battery 145 supplies electric power to the electric devices such as a starter motor and the like, while the alternator 144 is stopped (i.e., while the engine 105 is stopped).

As shown in FIG. 2 to FIG. 4, the transmission case 103 accommodates therein a hydraulic continuously variable transmission (HST) 120 which suitably changes the rotary power transmitted from the engine 105. The power of the engine 105 is transmitted to a main transmission input shaft 121 of the transmission case 103 through a main power shaft and a power transmission shaft which are not shown, and is transmitted to the left and right rear wheels 102, while its speed being appropriately changed by the hydraulic continuously variable transmission 120 and the traveling transmission gear mechanism.

The hydraulic continuously variable transmission 120 acts as a main transmission device and is structured by a hydraulic pump 124 and a hydraulic motor 126 connected with each other through a hydraulic circuit. The hydraulic pump 124 is driven by the main transmission input shaft 121, while the hydraulic motor 126 drives a transmission shaft 48.

One of the hydraulic pump 124 and the hydraulic motor 126 is a fixed displacement type and the other is a variable displacement type. In the present embodiment, the hydraulic motor 126 is the fixed displacement type whereas the hydraulic pump 124 is the variable displacement type, and the amount (delivery rate) of the working fluid delivered by the hydraulic pump 124 can be changed. It should be noted that the hydraulic motor 126 may be the variable displacement type and the hydraulic pump 124 may be the fixed displacement type.

The hydraulic pump 124 is provided with a movable swash plate 125 that changes the delivery rate according to its inclination angle. The movable swash plate 125 changes its inclination angle by driving an electric cylinder 143. The structure of varying the inclination angle of the movable swash plate 125 is detailed later.

The main transmission input shaft 121 is disposed so that its shaft line extends in a longitudinal direction (front-rear direction). The front end of the main transmission input shaft 121 is coupled with an output shaft 22 of the engine 105. Further, the rear end of the main transmission input shaft 121 is coupled with an output transmission shaft 23, and the output transmission shaft 23 is structured so as to integrally rotate with the output shaft 22 and the main transmission input shaft 121. The transmission shaft 48 as the main transmission output shaft is also disposed so that its shaft line extends in a longitudinal direction.

The output transmission shaft 23, the transmission shaft 48, and a front wheel transmission shaft 14 are disposed parallel to each other, behind the hydraulic continuously variable transmission 120, in the transmission case 103. The transmission shaft 48 is disposed to protrude rearward from the hydraulic motor 126, and continuously varied rotation by the hydraulic continuously variable transmission 120 is output to this transmission shaft 48.

The rear end portion of the front wheel transmission shaft 14 is coupled with a front wheel drive output shaft 30, and the rear portion of the front wheel drive output shaft 30 is provided with a later-detailed two-wheel/four-wheel drive switching mechanism 15. Further, behind the output transmission shaft 23, a PTO transmission mechanism 130 for suitably changing the rotation of the PTO shaft 119 is provided. The power of the engine 105 transmitted to the output transmission shaft 23 is suitably changed its speed by the PTO transmission mechanism 130, then transmitted to the PTO clutch shaft 29, and is output to the PTO shaft 119. With this structure, power can be transmitted to and drive the work machine 100 mounted at the rear end of the tractor 1.

Next, the following details a structure of power transmission system of the tractor, with reference to FIG. 4. Inside the clutch housing, a multi-plate type main clutch 21 is disposed, and this main clutch 21 is capable of switching between power transmission/shut-off through a clutch pedal. Then, after the rotation of the output shaft 22 (crank shaft) of the engine 105 is input to the main clutch 21, the output of the main clutch 21 is input to the hydraulic pump 124 through the main transmission input shaft 121, and to the PTO transmission mechanism 130 through the output transmission shaft 23. The output transmission shaft 23 extends rearward of the vehicle, and at the rear end thereof, the transmission gear 64 and the PTO third-speed click 64a are disposed.

Behind the output transmission shaft 23, a PTO clutch shaft 29 is rotatably supported. The PTO clutch shaft 29 is disposed so that its shaft line is matched with the output transmission shaft 23. The PTO clutch shaft 29 rotatably supports three PTO speed-change gears, that is, a PTO first-speed gear 61, a PTO second-speed gear 62, and a PTO reverse gear 63.

A main shaft 25 is disposed so as to be parallel to the PTO clutch 29, and rotatably supported. To the main shaft 25, four transmission gears 41, 42, 43, 44 are fixed. The transmission gear 64 disposed on the output transmission shaft 23 meshes with the transmission gear 44. Therefore, the main shaft 25 rotates with rotation of the output transmission shaft 23.

The transmission gear 41 of the main shaft 25 engage with the PTO first-speed gear 61, and the transmission gear 42 meshes with the PTO second-speed gear 62. The transmission gear 43 meshes with a rotatably-supported counter gear 37, and the counter gear 37 meshes with the PTO reverse gear 63. With this structure, by sliding later-described two PTO clutch sliders 93, 94 disposed on the PTO clutch shaft 29, the power of the output transmission shaft 23 can be appropriately changed and transmitted to the PTO clutch shaft 29.

The two PTO clutch sliders 93, 94 are spline-fitted to the PTO clutch shaft 29 in such a manner as to be relatively non-rotatable and axially slidable. The PTO clutch sliders 93, 94 can be moved in the axial directions by operating the PTO shift lever. The operator can operate the PTO shift lever to switch amongst a state where the PTO clutch slider 93 is coupled with the PTO third-speed click 64a, a state where the PTO clutch slider 93 is coupled with the PTO reverse gear 63, a state where the PTO clutch slider 94 is coupled with the PTO first-speed gear 61, and a state where the PTO clutch slider 94 is coupled with the PTO second-speed gear 62, so that the PTO clutch shaft 29 can receive rotation whose speed is changeable in three stages (or rotation of the reverse direction). The rotation of the PTO clutch shaft 29 is transmitted to the PTO shaft 119 through a speed-reduction gear 91 to drive the work machine 100.

A transmission shaft 48 is disposed so as to be parallel to the output transmission shaft 23, and is rotatably supported. To the transmission shaft 48, two gears 45, 46 are provided.

A sub transmission shaft 35 is disposed so as to be parallel to the transmission shaft 48, and is rotatably supported. To the sub transmission shaft 35, a gear 59 is relatively rotatably supported. The gear 45 fixed to the transmission shaft 48 meshes with the gear 59. The sub transmission shaft 35 is spline-fitted to the sub transmission shifter 92 with a gear in such a manner as to be relatively non-rotatable and axially slidable. The sub transmission shifter 92 can be moved in the axial directions by operating the sub shift lever. The operator can operate the sub shift lever to switch amongst a state where the sub transmission shifter 92 is coupled with a protrusion formed on the gear 59, a state where the gear of the sub transmission shifter 92 meshes with the gear 46 of the transmission shaft 48, so that the sub transmission shaft 35 receive rotation whose speed is changeable in two stages (or rotation of the reverse direction). Thus, the sub transmission device 200 capable of two-speed gear shift is structured. It should be noted however that no power is transmitted to the sub transmission shaft 35, when the sub transmission shifter 92 does not couple with the projection on the gear 59, and when the gear of the sub transmission shifter 92 does not mesh with the gear 46.

To the sub transmission shaft 35, three gears 20, 49, 19 are fixed. These gears 20, 49, 19 integrally rotate with the sub transmission shaft 35. The power transmitted to the sub transmission shaft 35 is output to a rear wheel drive system and a front wheel drive system by the gears 20, 49, 19.

The rear wheel drive system will be described. On the rear portion of the transmission case 103, a rear wheel differential device 66b is disposed. Rotation of the sub transmission shaft 35 is input to the rear wheel differential device 66b through a conical gear 20 fixed to the rear end of the sub transmission shaft 35, and drives the rear wheels 102 via an axle, transmission gears, and the like, in the rear axle case.

The front wheel drive system will be described. The front wheel drive output shaft 30 is disposed so as to be parallel to the sub transmission shaft 35, and is rotatably supported. To the front wheel drive output shaft 30, a drive input gear 50, an acceleration drive input gear 60 are relatively rotatably supported. The gear 19 of the sub transmission shaft 35 meshes with the drive input gear 50 and the gear 49 meshes with the acceleration drive input gear 60. On the front wheel drive output shaft 30, the later-detailed two-wheel/four-wheel drive switching mechanism 15 is disposed. The two-wheel/four-wheel drive switching mechanism 15 is structured to transmit the rotation of the drive input gear 50 or the acceleration drive input gear 60 to the front wheel drive output shaft 30. The rotation of the front wheel drive output shaft 30 is transmitted to the front wheel transmission shaft 14 connected to the front end of the front wheel drive output shaft 30 and is also input to the front wheel side differential device 66a via a universal joint and the like so as to drive the front wheels 101 through the axle, the transmission gears, and the like in the front axle case.

The hydraulic circuit will be briefly described. By driving the engine 105, the not-shown hydraulic pump is driven, and the hydraulic pump feeds the working fluid to a power steering device. By switching a directional control valve interlocked with rotation of the steering wheel 107, a power steering cylinder of the power steering device is extended and contracted to turn the front wheels. The working fluid having passed the power steering device is fed to the two-wheel/four-wheel drive switching mechanism 15 through a not-shown switching valve. Activating this switching mechanism performs switching over amongst front wheel acceleration, two-wheel drive, and four-wheel drive.

Next, the following describes a structure of changing the working fluid delivery rate of the hydraulic pump 124. As shown in FIG. 5, the tractor 1 includes a control unit 140, a reverser lever position detection unit (switching operation detection unit) 141, a main shift lever position detection unit 142, an electric cylinder (electric actuator) 143, and a potentiometer (inclination angle detection unit) 146.

The control unit 140 is constituted by a microcomputer and the like, and at least controls a device including the hydraulic continuously variable transmission 120. The reverser lever position detection unit 141 detects and outputs to the control unit 140, a lever position of the reverser lever 108. The main shift lever position detection unit 142 detects and outputs to the control unit 140, a lever position of the main shift lever 109. With this structure, the control unit 140 can grasp an operation of the reverser lever 108 and the main shift lever 109 by the operator.

The control unit 140 controls the expansion/contraction amount (drive amount) of the electric cylinder 143 based on the reverser lever position detection unit 141 and the main shift lever position detection unit 142. Further, the potentiometer 146 detects a rotation angle that changes according to the inclination angle of the movable swash plate 125, thereby detecting the inclination angle of the movable swash plate 125. This way, the control unit 140 can set the inclination angle of the movable swash plate 125 to a predetermined value.

For example, when the operator operates the reverser lever 108 to switch from the advance to the reverse, the control unit 140 controls the expansion/contraction amount of the electric cylinder 143 to change the movable swash plate 125 from an advance angle range to a reverse angle range. When the operator operates the reverser lever 108 to instruct the neutral, the control unit 140 controls the expansion/contraction amount of the electric cylinder 143 so that the movable swash plate 125 is in a neutral position (so that power is not transmitted to the transmission shaft 48). When the operator operates the main shift lever 109 to change the target speed, the expansion/contraction amount of the electric cylinder 143 is changed so that the rotation speed of the transmission shaft 48 is accelerated.

It should be noted that the control unit 140, the electric cylinder 143, the potentiometer 146 are driven by the electric power supplied from the above-described alternator 144; however, are driven by the electric power supplied from the battery 145 while the engine 105 is stopped.

Instead of the electric cylinder, traditional tractors each uses a hydraulic cylinder and therefore driving is not possible while the engine 105 is stopped. Therefore, when the engine abruptly stops during advancing or reversing, the inclination angle of the movable swash plate 125 could not be brought back to the neutral position. As a result, for example, when the engine 105 is restarted, the tractor 1 may slightly move and may bewilder the operator.

In this respect, the tractor 1 of the present embodiment, even when the engine 105 is stopped, the movable swash plate 125 can be brought back to the neutral position as long as the electronic equipment is in a usable state (as long as electric power is supplied from the battery 145), by switching the lever position of the reverser lever 108 to the neutral. Thus, an output of the hydraulic continuously variable transmission 120 can be prevented from being generated immediately after the engine 105 is restarted.

Further, a use of the electric cylinder instead of a hydraulic cylinder improves the positional accuracy of the rod through a simple control, and therefore the hydraulic continuously variable transmission 120 can be accurately controlled.

Next, the following describes a structure of switching the inclination angle of the movable swash plate 125 by driving the electric cylinder 143, with reference to FIG. 6 to FIG. 11. In the following description, a state where the movable swash plate 125 is in the advance angle range is referred to as "advancing state", whereas a state where the movable swash plate 125 is in the reverse angle range is referred to as "reversing state". Further, a state where the movable swash plate 125 is in the neutral position is referred to as "neutral state".

Figure 6:
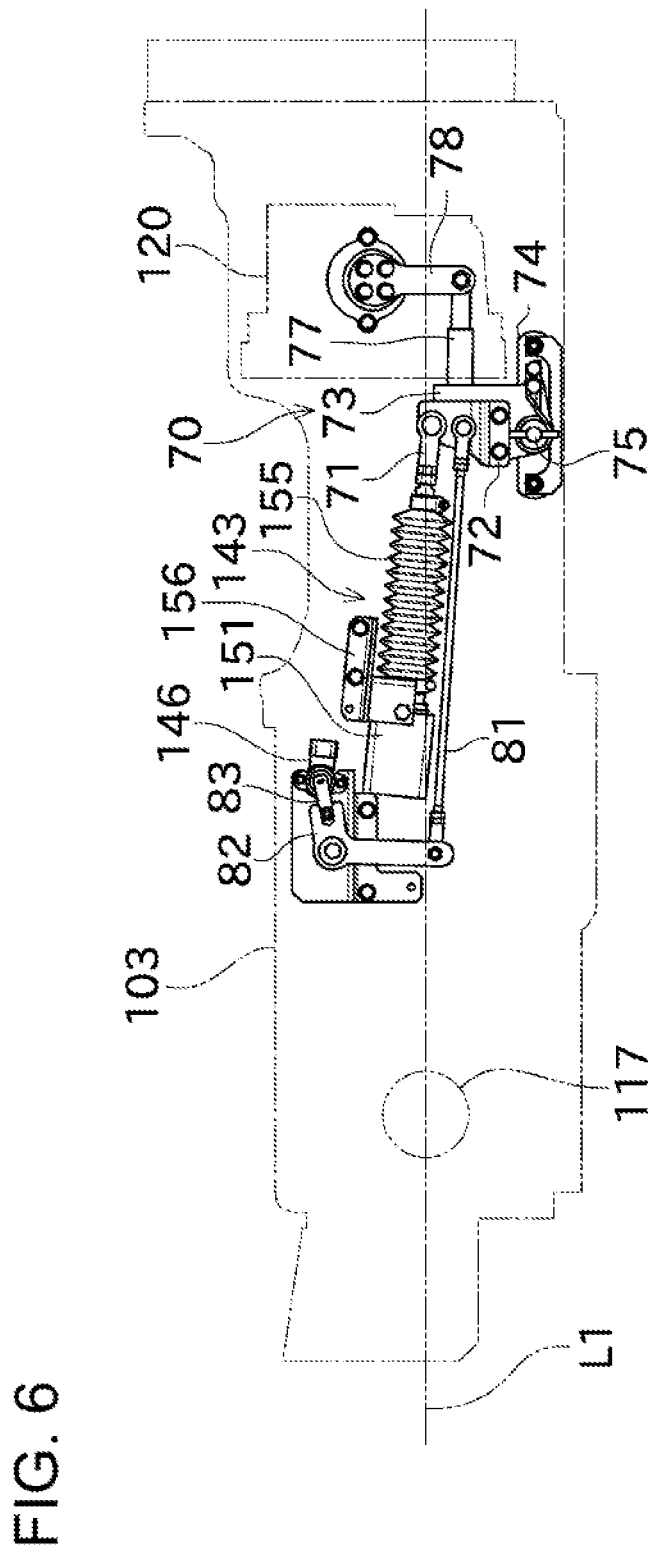
Figure 7:
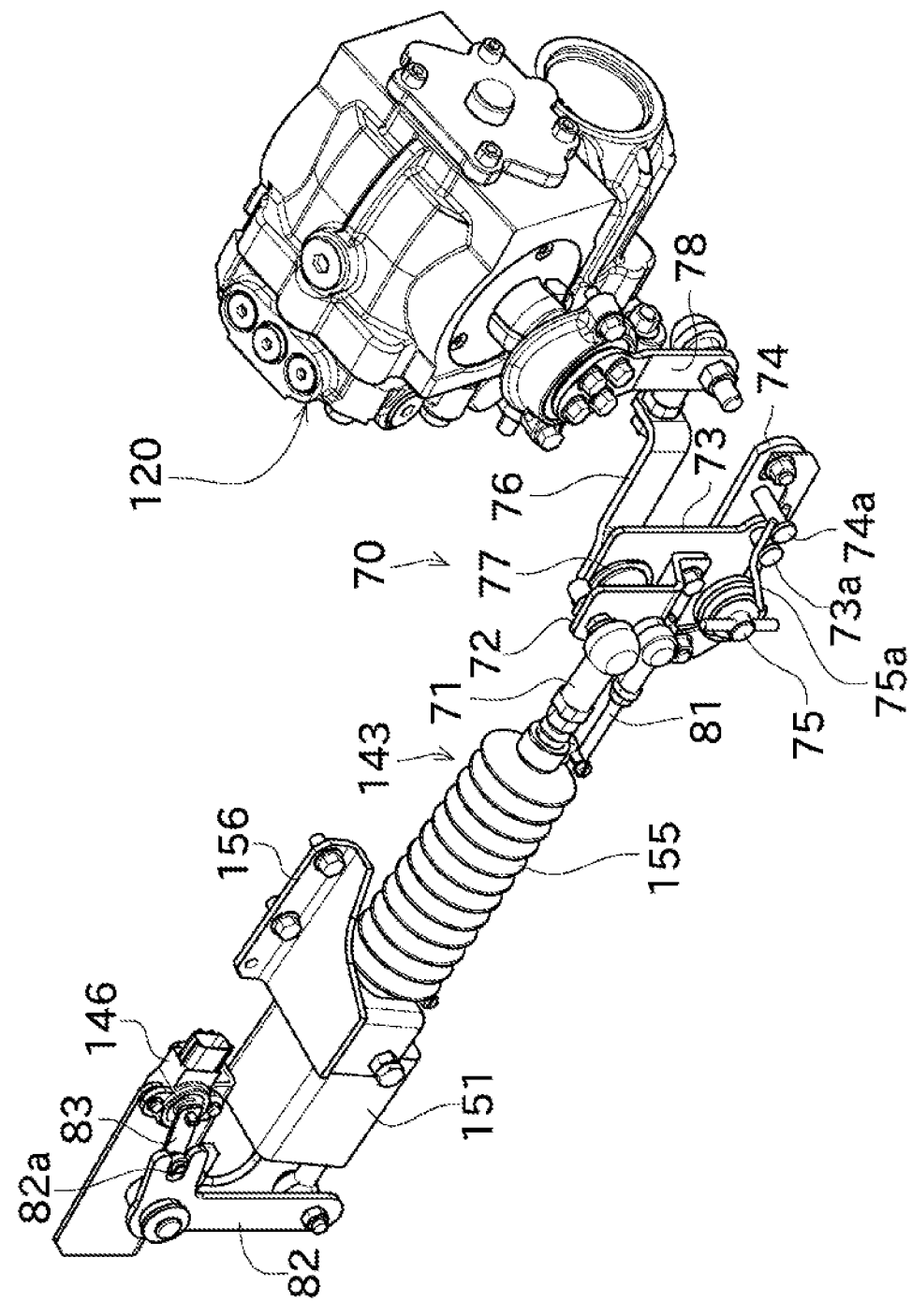
FIG. 7 A perspective view showing a structure of the electric cylinder and the power transmission mechanism.
Figure 8:
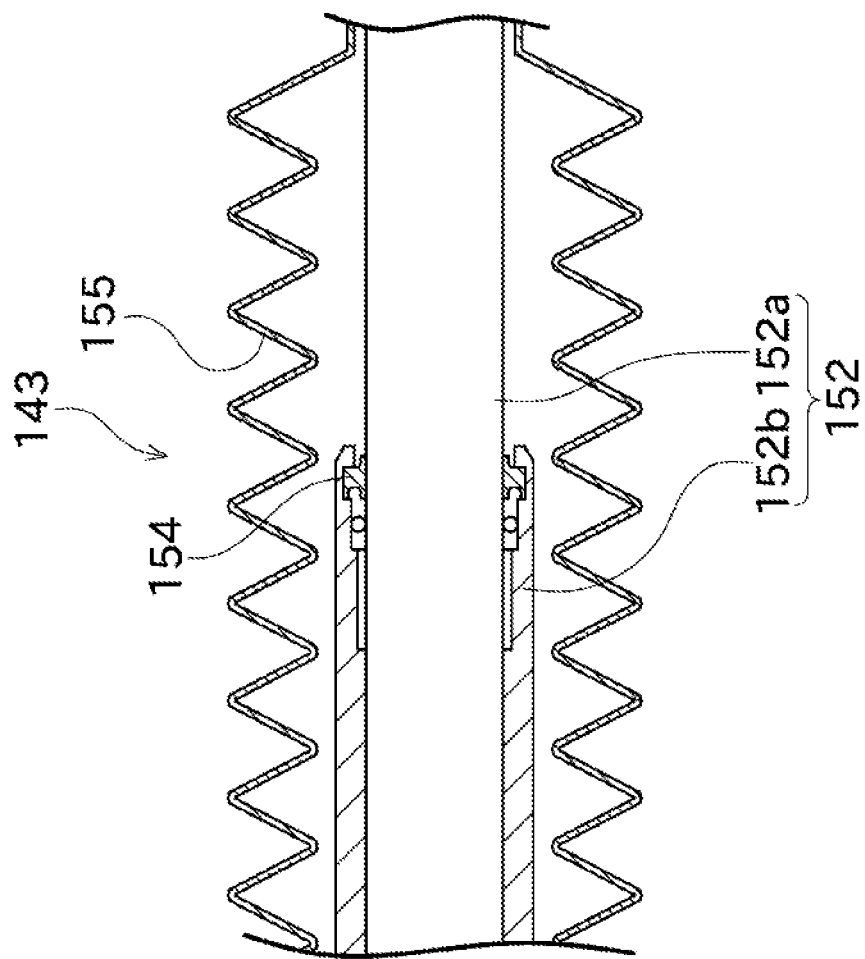
FIG. 8 A cross-sectional view showing an internal structure of the electric cylinder.
Figure 9:
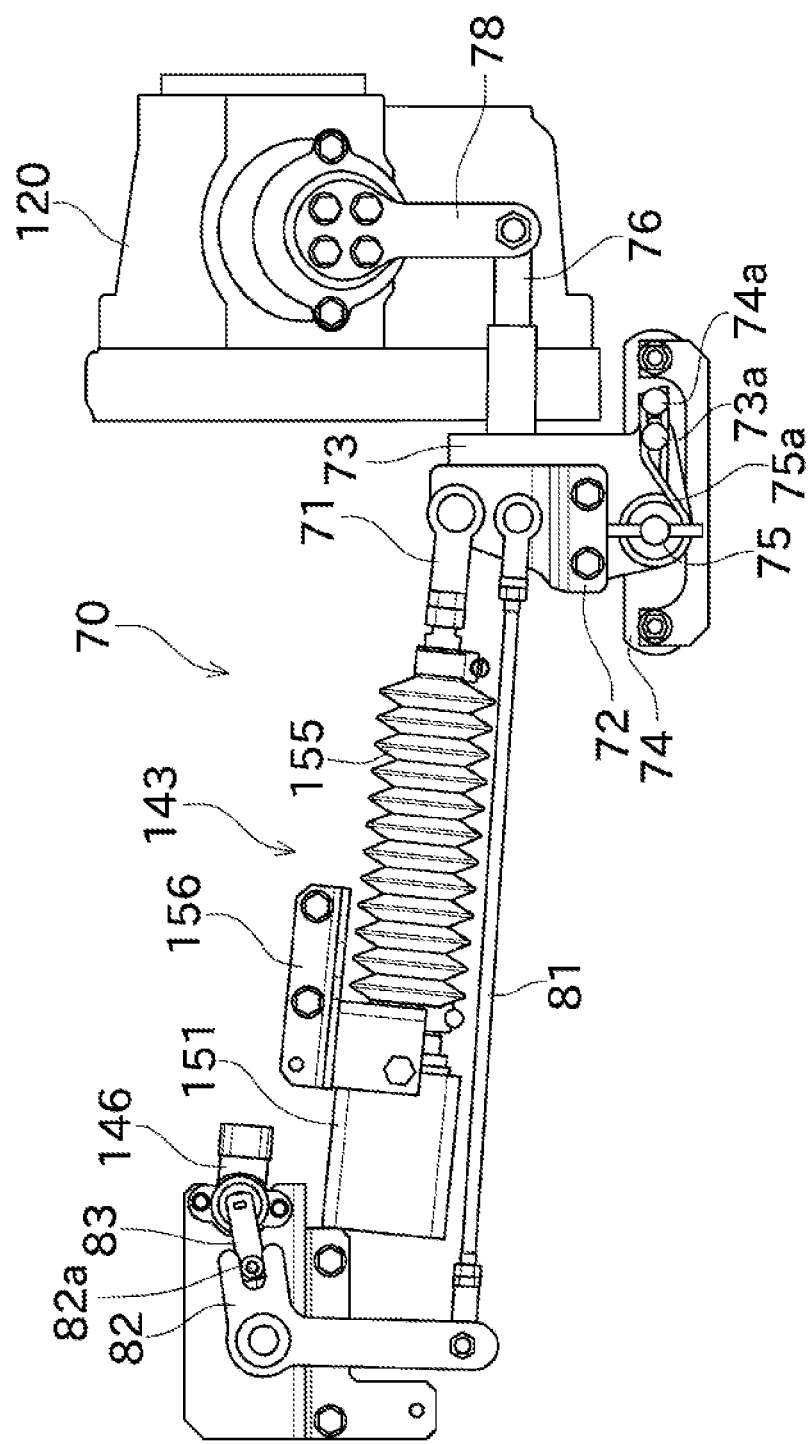
FIG. 9 A left side view showing a structure of the electric cylinder and the power transmission mechanism, while a movable swash plate is in a neutral position.

As shown in FIG. 6 to FIG. 8, the electric cylinder 143 includes a cylinder drive motor 151, an expansion/contraction part 152, a cleaning member 154, a protection boot 155, and a cylinder fixing plate 156. The electric cylinder 143 is disposed so that its length direction and its expansion/contraction direction substantially match with the longitudinal direction of the tractor 1. At least a part of the electric cylinder 143 is positioned higher than a virtual line L1 (FIG. 6) showing the height of the center of the rear axle 117.

The cylinder drive motor 151 is driven by receiving electric power supplied from the alternator 144 or the battery 145. The cylinder drive motor 151 is a stepping motor and the like and rotates by the number of rotations according to an instruction of the control unit 140. An output shaft of the cylinder drive motor 151 is transmitted to a not-shown ball screw. Rotation of the output shaft of the cylinder drive motor 151 slides a nut attached to the ball screw. It should be noted that the cylinder drive motor 151 is fixed to the transmission case 103 through the cylinder fixing plate 156. Further, most (at least the central portion) of the cylinder drive motor 151 is positioned higher than the virtual line L1.

As shown in FIG. 8, the expansion/contraction part 152 includes a rod (first member) 152a and a rod case (second member) 152b. The rod 152a is attached to this nut. Further, the rod case 152b is disposed outside the rod 152a so as to be movable relative to the rod 152a. By rotating the cylinder drive motor 151, the rod 152a can be moved (slid) with respect to the rod case 152b (the expansion/contraction part 152 can be expanded and contracted). Further, most (at least the central portion) of the expansion/contraction part 152 is positioned higher than the virtual line L1.

The cleaning member 154 is fixed inside the rod case 152b so as to contact the rod 152a. With this structure, the surface of the rod 152a can be cleaned by moving the rod 152a with respect to the rod case 152b. Therefore, even when mud and the like get on the surface of the rod 152a, that mud can be prevented from entering between the rod 152a and the rod case 152b.

The protection boot 155 is disposed so as to cover the expansion/contraction part 152. The protection boot 155 protects the expansion/contraction part 152 from water or mud splashed from the ground. Further, the protection boot 155 can be expanded and contracted, because it is made of soft resin or the like and has a bellows structure. Therefore, even when the expansion/contraction part 152 is expanded or contracted, the expansion/contraction part 152 can be protected. This makes it possible to more reliably prevent water, mud, and the like from entering between the rod 152a and the rod case 152b, thereby improving the reliability of the electric cylinder 143 (and in turn, the reliability of the hydraulic continuously variable transmission 120).

Further, the position of most of the electric cylinder 143 being higher than the virtual line L1 makes it harder to get water, mud and the like thereon. Therefore, the reliability of control of the hydraulic continuously variable transmission 120 can be further improved. The electric cylinder 143 is less resistant to water, mud, and the like as compared with a hydraulic cylinder; however, since the tractor 1 of the present embodiment enhances the resistance to water, mud, and the like in the structure and arrangement, sufficient reliability is achieved.

The tractor 1 includes a power transmission mechanism 70 configured to transmit drive of the electric cylinder 143 to a trunnion arm 78 of the hydraulic continuously variable transmission 120. As shown in FIG. 6 to FIG. 8, the power transmission mechanism 70 includes a cylinder link 71, a first rotary plate 72, a second rotary plate 73, a fixed plate 74, and a trunnion arm rotary link 76.

One end of the cylinder link 71 is connected to the rod 152a. Therefore, the cylinder link 71 can move integrally with the rod 152a. The other end of the cylinder link 71 is rotatably connected to the first rotary plate 72.

The first rotary plate 72 is a plate member bent in a crank-form as shown in FIG. 7. The cylinder link 71 is rotatably connected to an upper portion of the first rotary plate 72. The second rotary plate 73 is rotatably fixed by a bolt to a lower portion of the first rotary plate 72. Therefore, the first rotary plate 72 and the second rotary plate 73 are structured to be integrally movable.

The second rotary plate 73 is disposed closer to the transmission case 103 than the first rotary plate 72. The fixed plate 74 is rotatably connected to a lower portion of the second rotary plate 73. With this structure, the first rotary plate 72 and the second rotary plate 73 are integrally rotatable about a rotation shaft part 75.

A spring 75a is attached on the outside of this rotation shaft part 75. Further, a protrusion member 73a protruding to the opposite side of the transmission case 103 is attached to the second rotary plate 73. Likewise, a protrusion member 74a protruding to the opposite side of the transmission case 103 is attached to the fixed plate 74. The spring 75a is a coil spring, and is wound about the rotation shaft part 75. One end of the spring 75a is positioned on the lower side of the protrusion member 73a, and the other end of the spring 75a is positioned above the protrusion member 74a.

In this structure, when the first rotary plate 72 and the second rotary plate 73 rotate clockwise (FIG. 10, advancing state) or counterclockwise (FIG. 11, reversing state), the spring 75a biases the protrusion member 73a and the protrusion member 74a in directions to bring them closer to each other. This way, the first rotary plate 72 and the second rotary plate 73 are biased in a direction to return to the neutral state in FIG. 7.

As shown in FIG. 7, the trunnion arm rotary link 76 is rotatably connected to the transmission case 103 side of the upper portion of the second rotary plate 73 via a vibration isolation member 77. The vibration isolation member 77 prevents transmission of vibration between the hydraulic continuously variable transmission 120 and the electric cylinder 143. Therefore, for example, vibration generated in the hydraulic continuously variable transmission 120 can be prevented from being transmitted to the electric cylinder 143.

One end of the trunnion arm rotary link 76 is rotatably connected to the second rotary plate 73 as described above and the other end is rotatably connected to the trunnion arm 78. By rotating the trunnion arm 78, the inclination angle of the movable swash plate 125 can be changed.

Figure 10:
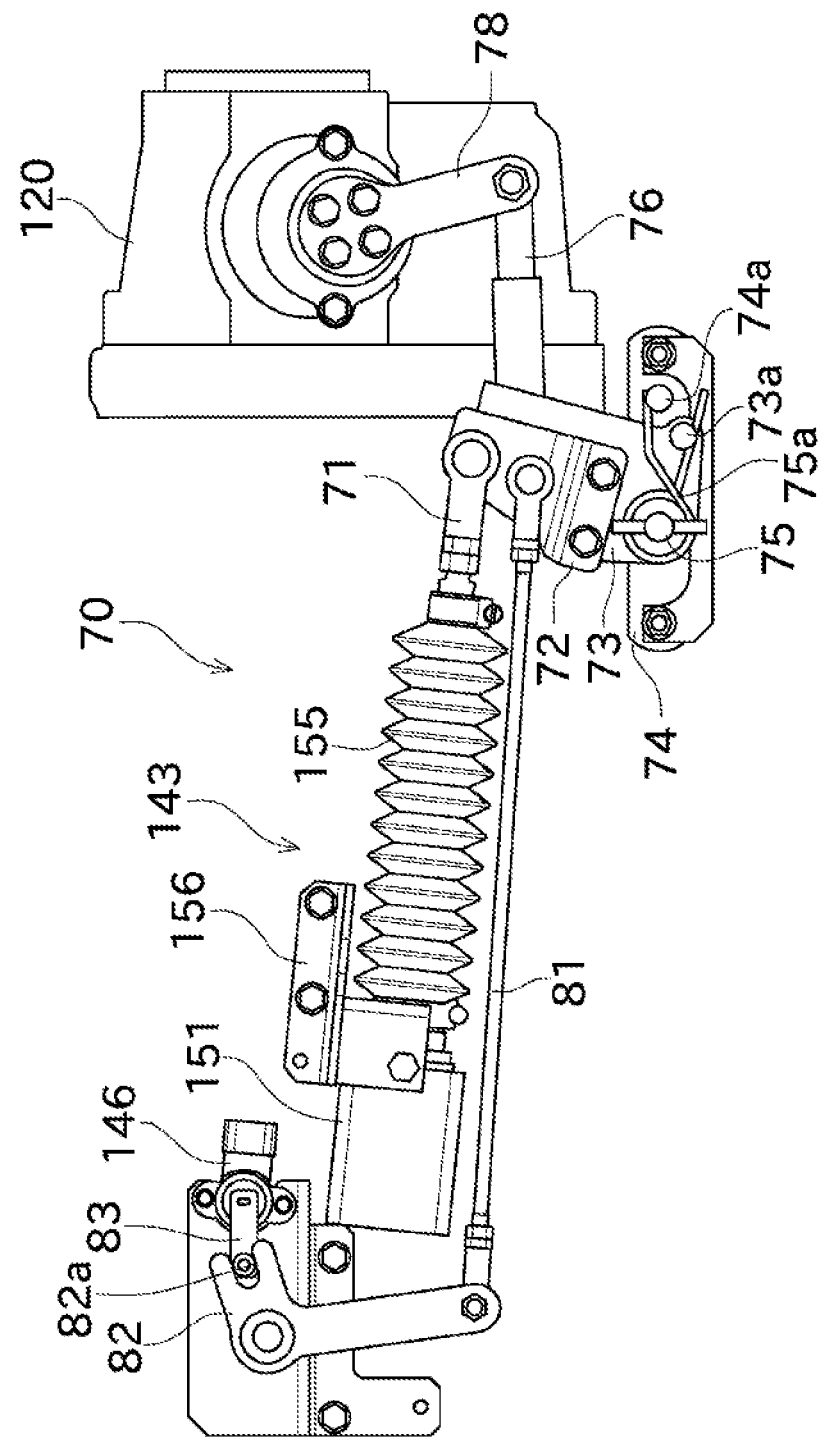
FIG. 10 A left side view showing a structure of the electric cylinder and the power transmission mechanism, while a trunnion arm is rotated forward.

With the above structure, expanding the electric cylinder 143 from the neutral state can rotate the trunnion arm 78 in the counterclockwise direction (rearward) to change the inclination angle of the movable swash plate 125 to the advance angle range (See FIG. 10). From the neutral state, contracting the electric cylinder 143 can rotate the trunnion arm 78 in the clockwise direction (forward) to change the inclination angle of the movable swash plate 125 to the reverse angle range (See FIG. 11). It should be noted that the relationship between the rotation direction of the trunnion arm 78 and the advance/reverse position of the movable swash plate 125 may be other way around.

The tractor 1 includes an arm member 81, an L-shaped link 82, a potentiometer turning link 83, and the potentiometer 146 as a structure for detecting the expansion/contraction amount of the electric cylinder 143 (i.e., an inclination angle of the movable swash plate 125).

The arm member 81 is an elongated member disposed substantially parallel to the electric cylinder 143. One end of the arm member 81 is rotatably connected to the first rotary plate 72 (more specifically, below the cylinder link 71). The other end of the arm member 81 is rotatably connected to the lower end of the L-shaped link 82.

The L-shaped link 82 is an L-shaped member and is structured to be rotatable about a connection part between one side and another side of the L shape. One end of the L-shaped link 82 is connected to the arm member 81. The other end of the L-shaped link 82 has a notched part 82a. The notched part 82a is connected to one end of the potentiometer turning link 83.

Figure 11:
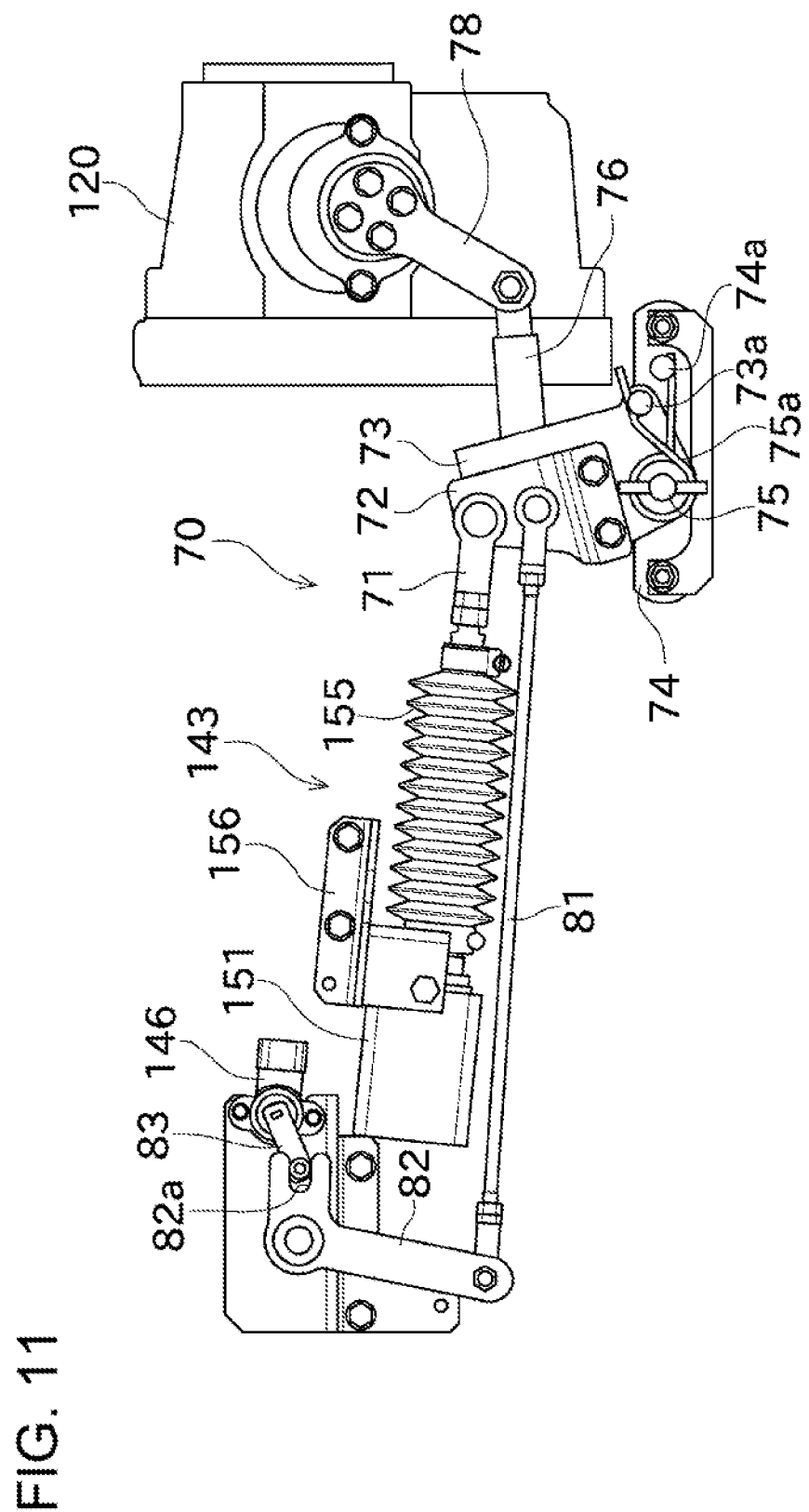
FIG. 11 A left side view showing a structure of the electric cylinder and the power transmission mechanism, while a trunnion arm is rotated rearward.

The potentiometer turning link 83 is a substantially rectangular plate-like member, and a cylindrical contact member attached to one end is positioned inside the notched part 82a. The other end of the potentiometer turning link 83 is rotatably connected to the potentiometer 146. With this structure, when the L-shaped link 82a rotates, the potentiometer turning link 83 receives a force from the notched part 82a and is rotated (FIG. 10 and FIG. 11).

The potentiometer 146 detects the rotation angle of the potentiometer turning link 83 and outputs the angle to the above-described control unit 140. The control unit 140 detects the inclination angle of the movable swash plate 125, based on the relationship between the rotation angle of the potentiometer turning link 83 and the inclination angle of the movable swash plate 125 (i.e., the expansion/contraction amount of the electric cylinder 143). Although the potentiometer 146 indirectly detects the inclination angle of the movable swash plate 125, such a structure is also encompassed in "detection of the inclination angle of the movable swash plate 125".

Further, the position of the potentiometer 146 being higher than the virtual line L1 makes it harder to get water, mud and the like thereon. Therefore, the reliability of the potentiometer 146, and consequently the reliability in controlling the hydraulic continuously variable transmission 120 can be further improved.

As described, the tractor 1 of the present embodiment includes an engine 105, a battery 145, a hydraulic continuously variable transmission 120, and an electric cylinder 143, and a power transmission mechanism 70. The battery 145 is charged while the engine 105 is running. The hydraulic continuously variable transmission 120 changes an output of the engine 105, and changes an inclination angle of a movable swash plate 125 to change a gear ratio (the rotating direction). The electric cylinder 143 is driven by electric power supplied from the battery 145 at least while the engine 105 is stopped. With the power generated in the electric cylinder 143 transmitted, the power transmission mechanism 70 changes the inclination angle of the movable swash plate 125 of the hydraulic continuously variable transmission 120.

With this, the inclination angle of the movable swash plate 125 of the hydraulic continuously variable transmission 120 can be changed even while the engine 105 is stopped. Therefore, for example even when the engine 105 abruptly stops, the hydraulic continuously variable transmission 120 can be changed back to neutral, by for example, changing the inclination angle of the movable swash plate 125. Thus, an output of the hydraulic continuously variable transmission 120 can be prevented from being generated immediately after the engine 105 is restarted.

Further, the tractor 1 of the present embodiment includes: a potentiometer 146 configured to detect the inclination angle of the movable swash plate 125. The potentiometer 146 detects the inclination angle of the movable swash plate 125 by electric power supplied from the battery 145 while the engine 105 is stopped.

With this, the inclination angle of the movable swash plate 125 can be accurately grasped even while the engine 105 is stopped. Therefore, for example, the hydraulic continuously variable transmission 120 can be accurately changed back to neutral while the engine 105 is stopped.

Further the tractor 1 of the present embodiment includes a reverser lever 108 and a reverser lever position detection unit 141. The reverser lever 108 is a lever capable of switching amongst advance, neutral, and reverse. The reverser lever position detection unit 141 detects an operation performed to the reverser lever 108. When the reverser lever position detection unit 141 detects an operation of the reverser lever 108 for switching to neutral while the engine 105 is stopped, the electric cylinder 143 changes the inclination angle of the movable swash plate 125 so that the hydraulic continuously variable transmission 120 is neutral.

This way, the hydraulic continuously variable transmission 120 can be changed back to neutral even while the engine 105 is stopped, with the same operation as the one while the engine is running.

As described, the tractor 1 of the present embodiment includes a body 2, front wheels 101 and rear wheels 102, the hydraulic continuously variable transmission 120, and the electric cylinder 143. The body 2 supports the engine 105. The front wheels 101 and the rear wheels 102 run the body 2. The hydraulic continuously variable transmission 120 changes an output of the engine 105, and changes an inclination angle of a movable swash plate 125 to change a gear ratio. The electric cylinder 143 changes the inclination angle of the movable swash plate 125 of the hydraulic continuously variable transmission 120. At least a part of the electric cylinder 143 is positioned higher than the center of the front wheels 101 and the rear wheels 102 relative to the vertical direction.

Thus, since the electric cylinder 143 is disposed in a relatively high position, water, mud, and the like from the ground are hardly scattered, and the reliability in controlling the hydraulic continuously variable transmission 120 can be improved.

Further, the tractor 1 of the present embodiment includes: a potentiometer 146 configured to detect the inclination angle of the movable swash plate 125. At least a part of the potentiometer 146 is positioned higher than the center of the front wheels 101 and the rear wheels 102 relative to the vertical direction.

Thus, since the potentiometer 146, in addition to the electric cylinder 143, is disposed in a relatively high position, the reliability in controlling the hydraulic continuously variable transmission 120 can be improved.

Further, in the tractor 1 of the present embodiment, the electric cylinder 143 includes a cylinder drive motor 151 and an expansion/contraction part 152. The expansion/contraction part 152 expands and contracts with an output from the cylinder drive motor 151. At least a part of the cylinder drive motor 151 is positioned higher than the center of the front wheels 101 and the rear wheels 102 relative to the vertical direction.

Thus, since the cylinder drive motor 151, which easily breaks down due to water scattered from the ground, is disposed in a relatively high position, the reliability in controlling the hydraulic continuously variable transmission 120 can be further improved.

Further, the tractor 1 of the present embodiment includes a protection boot 155 which is expandable and contractible, and which covers at least the circumference of the expansion/contraction part 152.

Thus, since the resistance to water, mud, and the like can be improved not only for the cylinder drive motor 151 but also for the expansion/contraction part 152, the reliability in controlling the hydraulic continuously variable transmission 120 can be further improved.

Further, in the tractor 1 of the present embodiment, the expansion/contraction part 152 includes a rod 152*a,* and a rod case 152*b.* The rod case 152*b* is positioned inside the rod 152*a,* and moves relatively to the rod 152*a.* To the rod 152*a,* a cleaning member 154 which cleans by rubbing the surface of the rod case 152*b* is attached.

Therefore, even when mud and the like get on the expansion/contraction part 152, the mud and the like can be removed by the cleaning member 154. Therefore, the reliability of control of the hydraulic continuously variable transmission 120 can be further improved.

Further, in the tractor 1 of the present embodiment, the electric cylinder 143 and the hydraulic continuously variable transmission 120 are connected through a vibration isolation member 77.

This way, vibration can be prevented from being transmitted between the hydraulic continuously variable transmission 120 and the electric cylinder 143.

Figure 12:
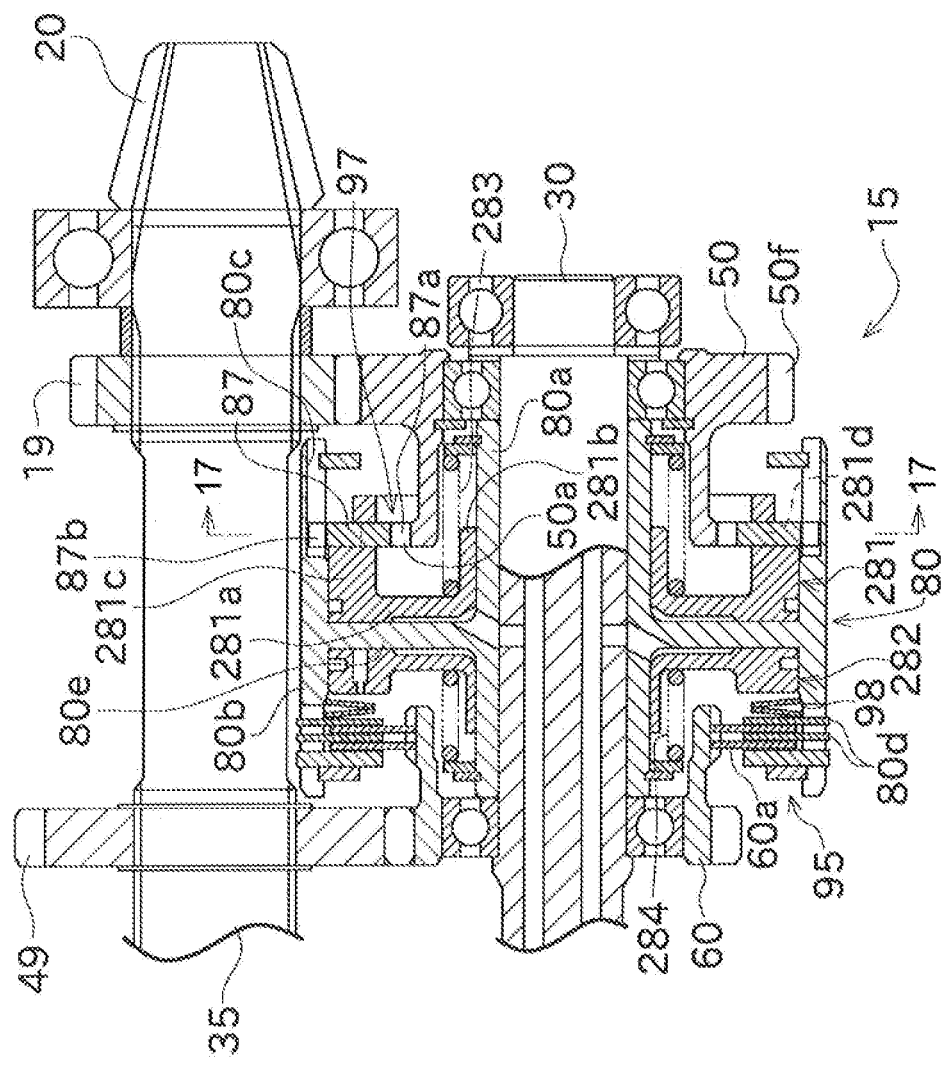
FIG. 12 A side cross sectional view showing a four-wheel drive state in a two-wheel/four-wheel drive switching mechanism disposed in the transmission case.
Figure 13:
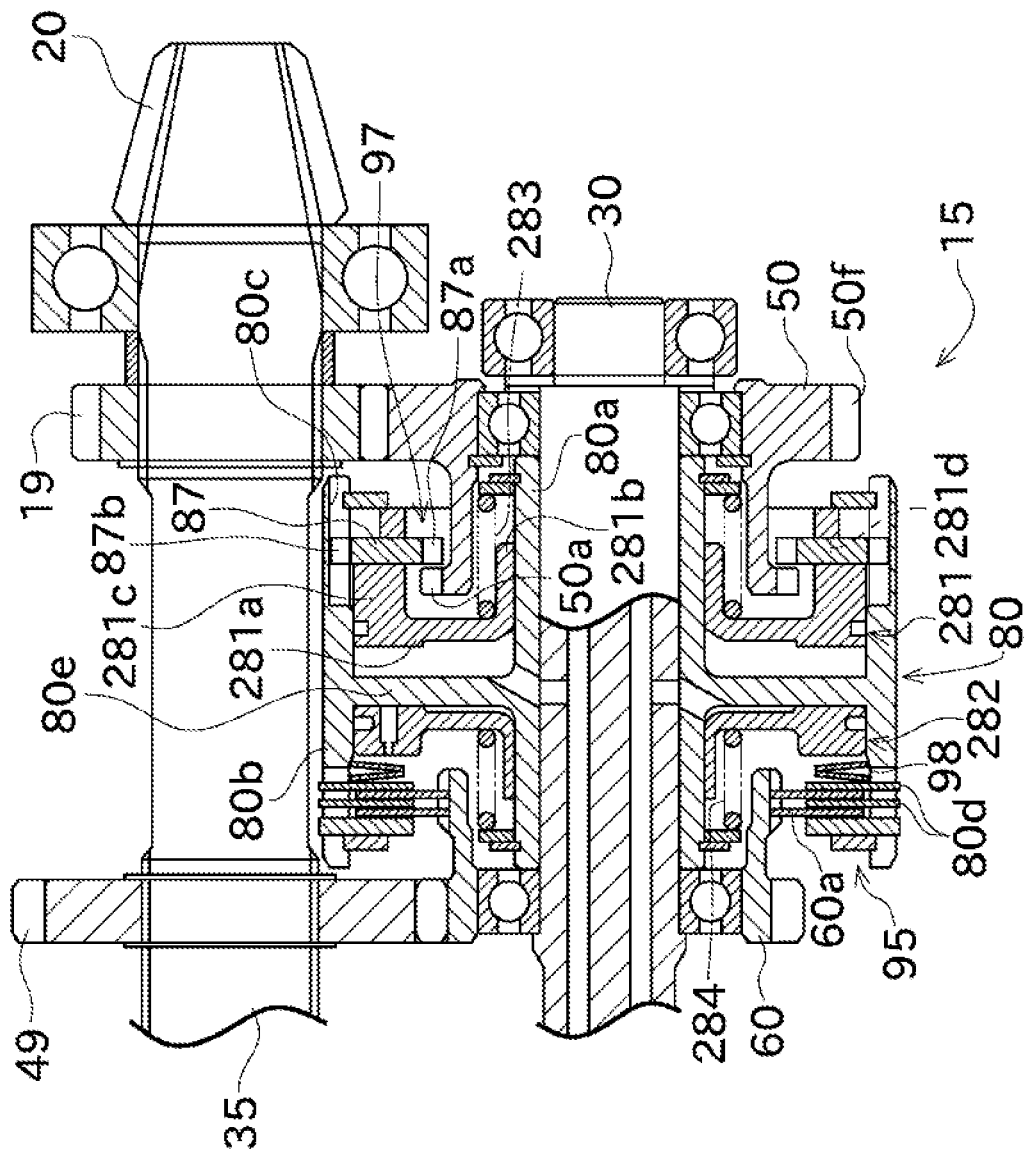
FIG. 13 A side cross sectional view showing a two-wheel drive state in the two-wheel/four-wheel drive switching mechanism disposed.

Next, the following describes the two-wheel/four-wheel drive switching mechanism 15 provided in the tractor 1 of the present embodiment, with reference to FIG. 12 and FIG. 13. FIG. 12 is a side cross sectional view showing a four-wheel drive state in the two-wheel/four-wheel drive switching mechanism 15 disposed in the transmission case 103. FIG. 13 is a side cross sectional view showing a two-wheel drive state in the two-wheel/four-wheel drive switching mechanism 15 disposed.

The two-wheel/four-wheel drive switching mechanism 15 also has a function of switching on and off the front wheel acceleration. Thus, for example, if detected turning angles of the front wheels 101 equal to a set angle or larger during driving in the four-wheel drive mode, it is possible to perform a control of automatically switching to a front wheel acceleration drive mode in which the circumferential speed of the front wheels 101 is accelerated more than the circumferential speed of the rear wheels 102 (automatic switching mode). This way, swift turning of the vehicle body can be achieved.

As shown in FIG. 12, the two-wheel/four-wheel drive switching mechanism 15 mainly includes a front wheel drive output shaft 30, a drive input gear 50, a cylinder member 80, a four-wheel drive clutch piston (piston) 281, a claw plate 87, and a spring (biasing member) 283. Further, the two-wheel/four-wheel drive switching mechanism 15 of the present embodiment includes an acceleration clutch piston 282, a spring 284, friction plates 60*a,* 80*d,* and a coned disk spring 98.

The front wheel drive output shaft 30 transmits a drive force to the front wheels 101. As shown in FIG. 4, the front end of the front wheel drive output shaft 30 is coupled with the above-described front wheel transmission shaft 14. The front wheel drive output shaft 30 is rotatably supported through a bearing at a lower front portion of the transmission case 103, in parallel to the output transmission shaft 23, the transmission shaft 48, the PTO shaft 119 and the like (i.e., with its axis oriented in the longitudinal direction). The front end of the front wheel drive output shaft 30 protrudes forward from the transmission case 103.

The drive input gear 50 shown in FIG. 12 is a gear for inputting the driving force from the sub transmission shaft 35 to the front wheel drive output shaft 30 when the front wheels 101 are driven at substantially the same circumferential speed as the rear wheels 102. Specifically, the drive input gear 50 is rotatably supported by the front wheel drive output shaft 30 through a bearing, and is mesh with the gear 19 of the sub transmission shaft 35. The drive input gear 50 has a generally cylindrical shape, and its one end portion (rear portion) relative to its axial direction has a flange-like shape which is enlarged in radial directions. On the outer circumference of the flange-like portion of the drive input gear 50, teeth 50*f* corresponding to the teeth of the gear 19 are formed. Inside a cylindrical portion of the drive input gear 50, a spring 283 is accommodated. A plurality of (three in the present embodiment) teeth 50*a* are arranged in a circumferential direction at regular intervals on the outer circumference of the front end of the cylindrical portion of the drive input gear 50.

The acceleration drive input gear 60 is a gear for inputting the driving force from the sub transmission shaft 35 to the front wheel drive output shaft 30 when the front wheels 101 are driven at an accelerated circumferential speed as compared to the rear wheels 102. Specifically, the acceleration drive input gear 60 is rotatably supported by the front wheel drive output shaft 30 through a bearing, and is mesh with the gear 49 of the sub transmission shaft 35. Since the diameter of the gear 49 is larger than the diameter of the gear 19, the acceleration drive input gear 60 obtains rotation faster than the drive input gear 50. The acceleration drive input gear 60 has a generally cylindrical shape, and has teeth corresponding to the teeth of the gear 49 on the outer circumference of its front end portion. On the outer circumference of the rear portion of the acceleration drive input gear 60, a plurality of friction plates 60a are attached in a relatively non-rotatable manner. Inside a cylindrical portion of the acceleration drive input gear 60, a spring 284 is accommodated.

Between the drive input gear 50 and the front wheel drive output shaft 30, a claw type clutch 97 is disposed, and between the acceleration drive input gear 60 and the front wheel drive output shaft 30, a friction type clutch 95 is disposed. The claw type clutch 97 and the friction type clutch 95 are structured so that their engaged/disengaged state is switched by a hydraulic actuator. That is, between the drive input gear 50 and the acceleration drive input gear 60, the cylinder member 80 to serve as a clutch case is disposed. This cylinder member 80 is fixed to the front wheel drive output shaft 30 in a relatively non-rotatable manner. The cylinder member 80 is formed in a double-cylinder form having an inner cylinder 80a and an outer cylinder (cylinder part) 80b, and the inner cylinder 80a and the outer cylinder 80b are connected by a ring-shaped partition wall 80e extending perpendicularly to the shaft direction (in other words, extending radially outward from the front wheel drive output shaft 30). The inner cylinder 80a of the cylinder member 80 is fixed to the front wheel drive output shaft 30 in a relatively non-rotatable manner.

A space between the inner cylinder 80a and the outer cylinder 80b is parted into two spaces by the partition wall 80e formed into a plate shape (flange-shape). Of the two spaces parted by the partition wall 80e, the four-wheel drive clutch piston 281 is disposed in an axially-slidable manner in a space on a side (rear side) close to the drive input gear 50, and an acceleration clutch piston 282 is disposed in an axially slidable manner, in a space on a side (front side) close to the acceleration drive input gear 60. This structures the hydraulically-driven claw type clutch 97 on the rear side of the partition wall 80e, and the hydraulically-driven friction type clutch 95 on the front side of the partition wall 80e.

As shown in FIG. 12, the four-wheel drive clutch piston 281 is structured in a ring-shape, and includes an action part 281a, an inner cylinder part 281b, and an outer cylinder part 281c.

The action part 281a is formed in a ring-shape, and disposed to face the partition wall 80e in the axial direction. The surface of the action part 281a on a side close to the partition wall 80e is an action surface on which the pressure of the working fluid acts and press the four-wheel drive clutch piston 281. That is, when the working fluid is supplied into the cylinder member 80 through an oil passage formed in the front wheel drive output shaft 30, the action part 281a is pushed, thereby moving the four-wheel drive clutch piston 281 in a direction away from the partition wall 80e. On the other hand, on a side of the action part 281a far from the partition wall 80e, the spring 283 is disposed which biases the four-wheel drive clutch piston 281 in a direction against the push by the pressure of the working fluid (i.e., in a direction towards the partition wall 80e).

The inner cylinder part 281b is formed in a substantially cylindrical shape and is integrally formed to extend from an inner edge portion of the action part 281a relative to the radial directions, towards one side in the axial direction. The inner cylinder part 281b is disposed outside the inner cylinder 80a of the cylinder member 80 and can move in the axial directions, while maintaining liquid-tightness with the inner cylinder 80a.

The outer cylinder part 281c is formed in a substantially cylindrical shape with a larger diameter than the inner cylinder part 281b, and is integrally formed to extend from an outer edge portion of the action part 281a relative to the radial directions, towards one side in the axial direction. The outer cylinder part 281c is disposed inside the outer cylinder 80a of the cylinder member 80 and can move in the axial directions, while maintaining liquid-tightness with the outer cylinder 80b.

On the outer cylinder part 281c of the four-wheel drive clutch piston 281, claw plates 87 are attached. As described later, each of the claw plates 87 is attached to the four-wheel drive clutch piston 281 so as to be relatively non-rotatable and axially non-slidable. Further, the claw plate 87 is structured so as to be relatively non-rotatable with respect to the outer cylinder 80b of the cylinder member 80. This way, relative rotation with respect to the cylinder member 80 of the four-wheel drive clutch piston 281 is restricted.

The claw plate 87 has a first pawl 87a protruding radially inwardly, and this first pawls 87a can mesh with the teeth 50a of the drive input gear 50.

Further, the claw plate 87 has second pawls 87b on an outside portion relative to radial directions, these second pawls 87b mesh with spline-like grooves 80c formed on the inner circumference of the outer cylinder 80b of the cylinder member 80. Therefore, the claw plates 87 are relatively non-rotatable, but axially slidable, with respect to the cylinder member 80.

In this structure, when no oil pressure is acting on the four-wheel drive clutch piston 281, the spring 283 pushes the four-wheel drive clutch piston 281 in the direction towards the partition wall 80e. Therefore, the teeth 50a of the drive input gear 50 mesh with the first pawls 87a of the claw plates 87, as shown in FIG. 12. As a result, the power of the drive input gear 50 is transmitted to the front wheel drive output shaft 30 from the second pawls 87b of the claw plates 87 through the cylinder member 80 (four-wheel drive). To the contrary, when an oil pressure acts on the four-wheel drive clutch piston 281, the four-wheel drive clutch piston 281 is pushed in the direction away from the partition wall 80e. Therefore, the claw plates 87 are displaced in the axial direction, and the teeth 50a of the drive input gear 50 and the first pawls 87a of the claw plates 87 are disengaged, as shown in FIG. 13. As a result, the power of the drive input gear 50 is not transmitted to the front wheel drive output shaft 30 (two-wheel drive).

As shown in FIG. 12, the acceleration clutch piston 282 is formed in a ring-shape. The surface of the acceleration clutch piston 282 on a side close to the partition wall 80e is an action surface on which the pressure of the working fluid acts and press the acceleration clutch piston 282. That is, when the working fluid is supplied into the cylinder member 80 through an oil passage formed in the front wheel drive output shaft 30, the acceleration clutch piston 282 is pushed, thereby moving the acceleration clutch piston 282 in a direction away from the partition wall 80e. On the other hand, on a side of the acceleration clutch piston 282 far from the partition wall 80e, the spring 284 is disposed which biases the acceleration clutch piston 282 in a direction against the push by the pressure of the working fluid (i.e., in a direction towards the partition wall 80e).

On the outer cylinder 80b of the cylinder member 80, a plurality of friction plates 80d are attached in a relatively non-rotatable manner. The friction plates 80d are disposed in an alternating manner with the friction plates 60a attached to the acceleration drive input gear 60.

In this structure, when no oil pressure is acting on the acceleration clutch piston 282, the spring 284 pushes the acceleration clutch piston 282 in the direction towards the partition wall 80e. Therefore, the friction plates 60a and 80d are not pressed against each other. Therefore, the power of the acceleration drive input gear 60 is not transmitted to the front wheel drive output shaft 30 (two-wheel drive). To the contrary, when an oil pressure acts on the acceleration clutch piston 282, the acceleration clutch piston 282 is pushed in the direction away from the partition wall 80e, thus pressing the friction plates 60a and 80d against each other in the axial direction. As a result, the friction plates 60a and 80d are coupled with each other by friction, the power of the acceleration drive input gear 60 is transmitted to the front wheel drive output shaft 30 through the cylinder member 80 (front wheel acceleration drive).

Figure 14A:
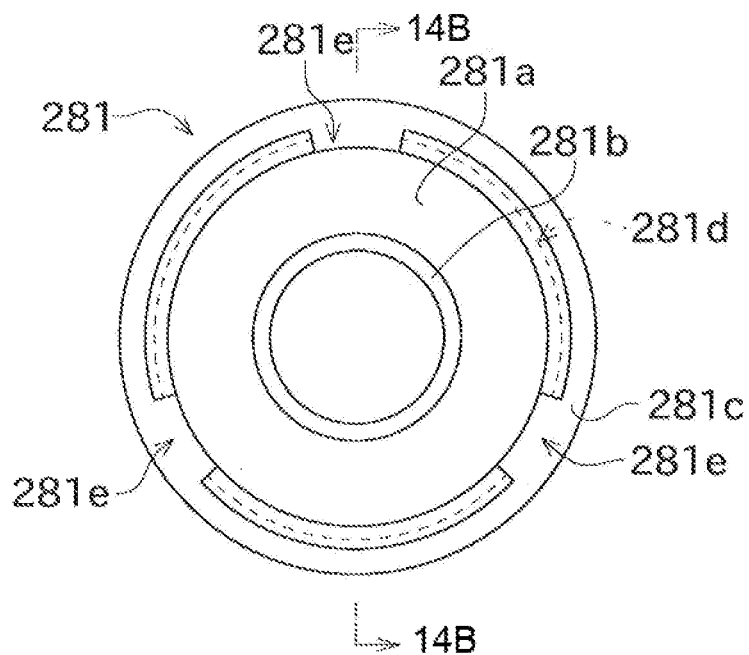
FIG. 14 Figures including FIG. 14A which is a rear view of the four-wheel drive clutch piston, and FIG. 14B which is a cross-sectional view taken along the line 14B-14B in FIG. 14A.
Figure 17:
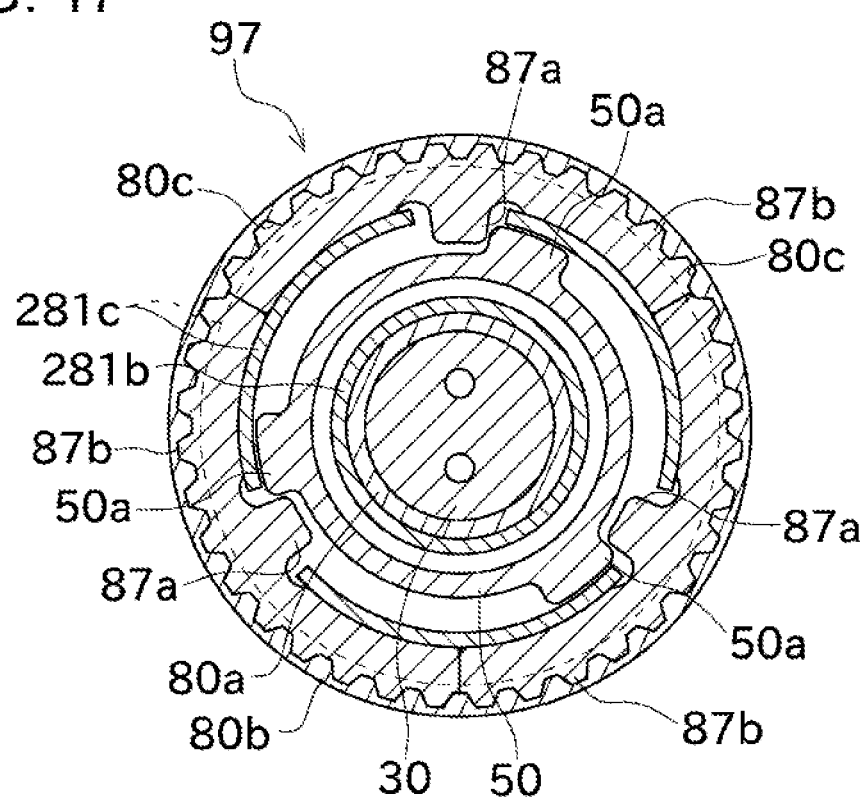
FIG. 17 An end view taken along the line 17-17 of FIG. 12.

Next, the following details the four-wheel drive clutch piston 281 and the claw plates 87, with reference to FIG. 14A to FIG. 17. FIG. 14A is a rear view of the four-wheel drive clutch piston 281. FIG. 14B is a cross-sectional view taken along the line 14B-14B in FIG. 14A. FIG. 15A is a diagram showing one of the claw plates 87. FIG. 15B is a diagram showing a state in which three claw plates 87 are attached to the four-wheel drive clutch piston 281. FIG. 16A is a rear view showing the four-wheel drive clutch piston 281 with the claw plates 87 attached. FIG. 16B is a cross-sectional view taken along the line 16B-16B in FIG. 16A. FIG. 17 is an end view taken along the line 17-17 of FIG. 12.

Figure 14B:
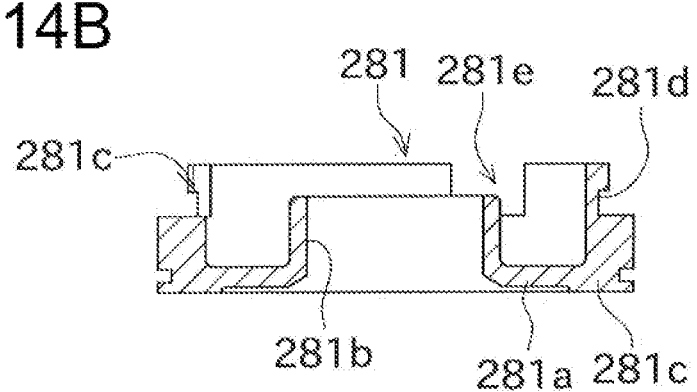

As shown in FIGS. 14A and 14B, on the outer circumference of the outer cylinder part 281c of the four-wheel drive clutch piston 281, an attachment groove 281d elongated in the circumferential direction is formed. This attachment groove 281d is formed so as to open the radially outer side.

Further, a plurality of insertion portions 281e each having a shape penetrating in radial directions are formed in the outer cylinder part 281c so as to connect the bottom of the attachment grooves 281d to the inner side of the outer cylinder part 281c. In the present embodiment, three insertion portions 281e are formed at regular intervals in the circumferential direction (specifically, at intervals of 120°) so as to divide the outer cylinder part 281c (attachment groove 281d) into multiple parts in the circumferential direction. Further, each of the insertion portions 281e is formed as a notch in the outer cylinder part 281c such that one side in the axial direction is opened.

Figure 15A:
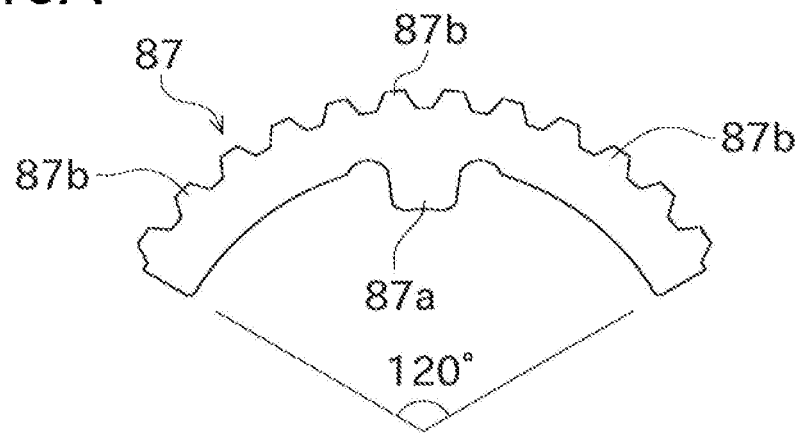
FIG. 15 Figures including FIG. 15A which is a diagram showing a single one of the claw plates, and FIG. 15B which is a diagram showing a state in which three claw plates are attached to the four-wheel drive clutch piston.
Figure 15B:
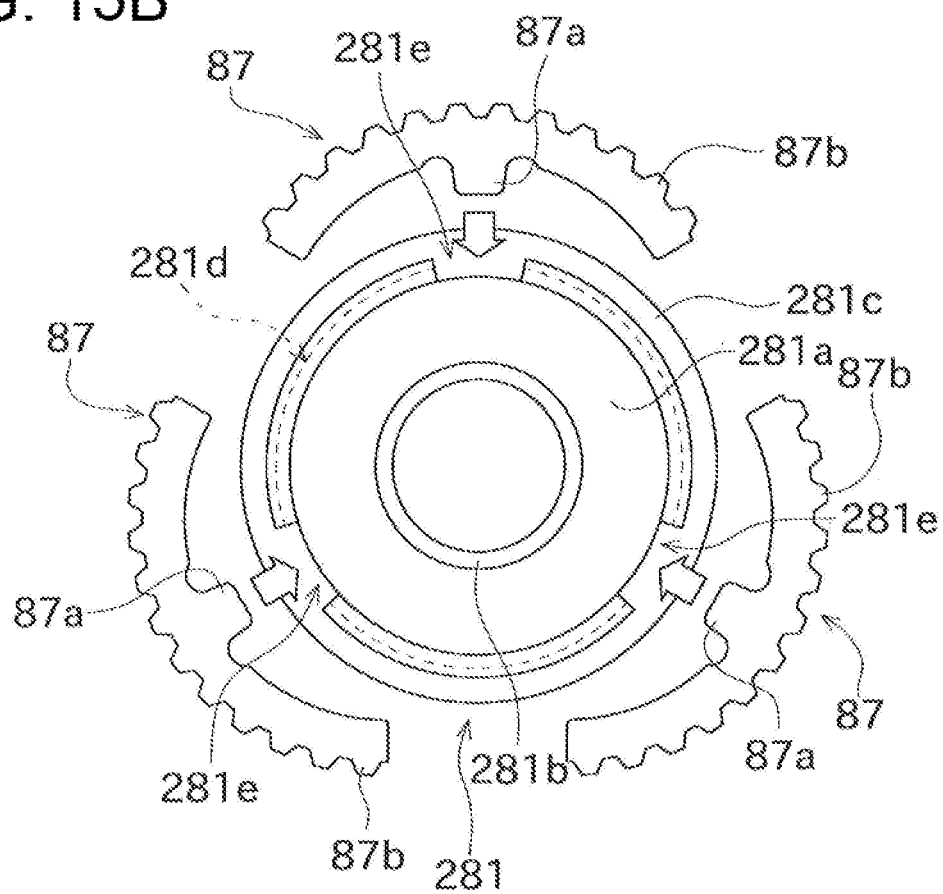
Figure 16A:
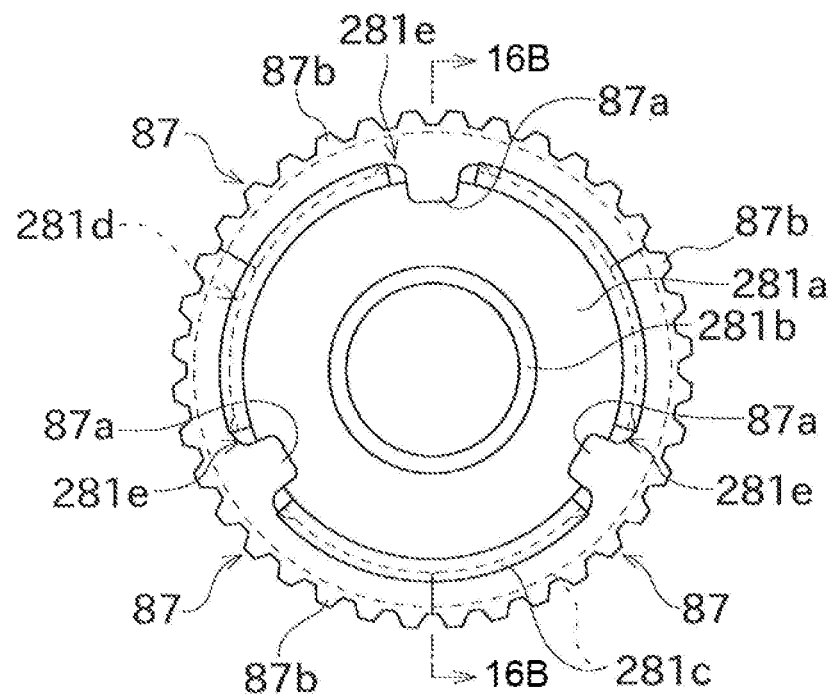
FIG. 16 Figures including FIG. 16A which is a rear view showing the four-wheel drive clutch piston with the claw plates are attached, and FIG. 16B which is a cross-sectional view taken along the line 16B-16B in FIG. 16A.
Figure 16B:
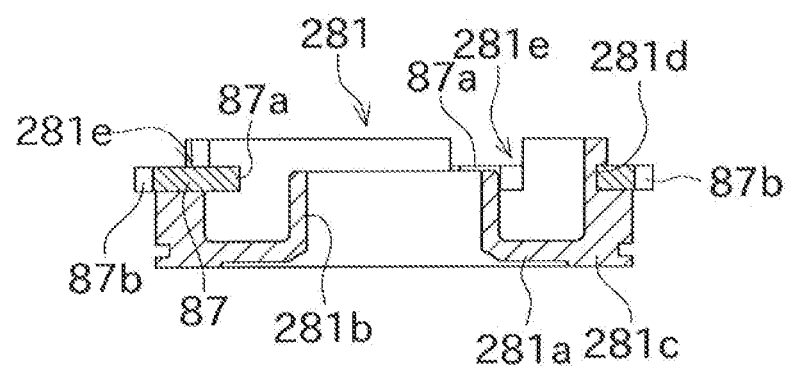

The claw plates 87 shown in FIGS. 15A and 15B are configured to be attached to the attachment grooves 281d. As shown in FIG. 15A, each claw plate 87 of the present embodiment is a plate member having a predetermined width, and having an arc shape of approximately 120° in angle. The inner diameter of the claw plate 87 is substantially equal to the diameter of the bottom portion of the attachment groove 281d. Further, the thickness of the claw plate 87 is substantially equal to the width of the attachment groove 281d.

As shown in FIG. 15A, in a circumferentially middle portion of each claw plate 87 has the first pawl 87a protruding radially inwardly. The first pawl 87a is formed so as to be inserted into the insertion portion 281e formed on the outer cylinder part 281c.

Further, on the outer edge of the claw plate 87, the second pawls 87b protruding radially outwardly are aligned in the circumferential direction.

The claw plates 87 structured as described above can be attached to the attachment groove 281d, by inserting their first pawls 87a into the insertion portions 281e of the four-wheel drive clutch piston 281 (outer cylinder part 281c) from radially outer side, as shown in FIG. 15B. In the present embodiment, a plurality of (three) claw plates 87 each having an identical shape are adopted and are attached in such a manner as to surround the entire circumference of the four-wheel drive clutch piston 281, each covering an equal amount of the circumference.

With this structure, the plurality of claw plates 87 can be easily attached to the four-wheel drive clutch piston 281, by inserting each of the claw plates 87 into the attachment groove 281d from radially outside the four-wheel drive clutch piston 281.

At this time, since each of the claw plates 87 is inserted into the attachment groove 281d, the movement of the claw plates 87 in the axial direction is restricted by the inner wall of the attachment groove 281d.

Further, the first pawl 87a of each of the claw plates 87, when inserted into the insertion portion 281e of the four-wheel drive clutch piston 281, protrudes radially inward from the inner circumference of the outer cylinder part 281c. This protruded portion can contact the tooth 50a of the drive input gear 50 (see FIG. 17). The first pawl 87a contacts the inner walls of the insertion portion 281e so that the claw plate 87 is restricted from rotating relative to the four-wheel drive clutch piston 281. That is, since the first pawl 87a (for inputting power by contacting the teeth 50a of the drive input gear 50) also functions as rotation stopper of the claw plate 87 with respect to the four-wheel drive clutch piston 281, the structure can be simplified.

When the four-wheel drive clutch piston 281, with the claw plates 87 assembled therewith, is accommodated inside the outer cylinder 80b of the cylinder member 80, radially outward movement of the claw plates 87 is restricted by the outer cylinder 80b of the cylinder member 80 (see FIG. 12 and FIG. 17). By assembling the two-wheel/four-wheel drive switching mechanism 15 as described, the claw plate 87 can be retained without dropping out from the attachment groove 281d of the four-wheel drive clutch piston 281.

Further, in the present embodiment, the three claw plates 87 have an identical shape. Therefore, the three claw plates 87 can be easily manufactured (in the present embodiment, the three claw plates 87 are manufactured by punching out a metal plate with a single press die). As a result, the manufacturing costs and the manufacturing processes can be reduced.

As described, the structure of the present embodiment can achieve, without a need of a high-cost method such as welding, a structure in which the plurality of radially inwardly protruding first pawls 87a and the plurality of radially outwardly protruding second pawls 87b are relatively non-rotatable and axially non-slidable with respect to the four-wheel drive clutch piston 281. As a result, the cost-cut for the claw type clutch 97 provided to the two-wheel/four-wheel drive switching mechanism 15 can be favorably achieved.

As hereinabove described, the tractor 1 of the present embodiment includes a front wheel drive output shaft 30, a drive input gear 50, a cylinder member 80, a four-wheel drive clutch piston 281, and a spring 283. The front wheel drive output shaft 30 transmits a drive force to the front wheels 101. The drive input gear 50 is rotatably supported by the front wheel drive output shaft 30, and meshes with a gear 19 which integrally rotates with a sub transmission shaft 35 which is a shaft for speed changing. The cylinder member 80 has a partition wall 80e extended radially outward from the front wheel drive output shaft 30, and is fixed to the front wheel drive output shaft 30. The four-wheel drive clutch piston 281 is accommodated in the cylinder member 80 while being restricted from rotating relative to the cylinder member 80. The spring 283 biases the four-wheel drive clutch piston 281 in a direction towards the partition wall 80e. The tractor 1 has a two-wheel/four-wheel drive switching mechanism 15. The two-wheel/four-wheel drive switching mechanism 15 moves the four-wheel drive clutch piston 281 in the axial direction, so that a state in which the rotation of the four-wheel drive clutch piston 281 is restricted from rotating relative to the drive input gear 50 to transmit the drive force of the sub transmission shaft 35 to the front wheel drive output shaft 30 through the gear 19, the drive input gear 50, four-wheel drive clutch piston 281, and the cylinder member 80, and a state in which the four-wheel drive clutch piston 281 is rotatable relatively to the drive input gear 50 are switched from one another by the claw type clutch 97. The drive input gear 50 has a plurality of teeth 50a aligned in the circumferential direction. On the outer circumference of the four-wheel drive clutch piston 281, an attachment groove 281d extended in the circumferential direction is formed. To this attachment groove 281d, claw plates 87 each having a first pawl 87a corresponding to the teeth 50a of the drive input gear 50 are inserted in such a manner as to be relatively non-rotatable with respect to the four-wheel drive clutch piston 281. With the teeth 50a of the drive input gear 50 contacting the first pawls 87a, the four-wheel drive clutch piston 281 is restricted from rotating relative to the drive input gear 50.

Thus, by inserting the claw plates 87 into the attachment groove 281d on the outer circumference of the four-wheel drive clutch piston 281, the four-wheel drive clutch piston 281 can be used as a clutch for switching between transmission and shutting of the drive force from the drive input gear 50 to/from the four-wheel drive clutch piston 281, and hence can be used as a clutch for switching between a two-wheel drive and a four-wheel drive. Therefore, a claw type clutch 97 can be structured at a lower cost than a structure in which claw plates (plates having a plurality of teeth) are fixed to a piston by welding and the like.

Further, in the tractor 1 of the present embodiment, each of the claw plates 87 further has second pawls 87b. The first pawl 87a is formed so as to protrude radially inwardly from the claw plate 87. The second pawls 87b are formed so as to protrude radially outwardly from the claw plate 87. On the cylinder member 80, grooves 80c corresponding to the second pawls 87b are formed.

Since both the first pawl 87a and the second pawls 87b are formed on each of the claw plates 87, the four-wheel drive clutch piston 281 can be restricted from rotating relative to the drive input gear 50 or relative to the cylinder member 80, simply by attaching the claw plates 87 to the attachment groove 281d on the outer circumference of the four-wheel drive clutch piston 281.

Further, in the tractor 1 of the present embodiment, the plurality of claw plates 87 each covers a part of the outer circumference of the four-wheel drive clutch piston 281, thereby surrounding the outer circumference.

With this structure, each of the claw plates 87 can be inserted into the attachment groove 281d from radially outside the four-wheel drive clutch piston 281, which makes it easy to attach the claw plates 87 to the four-wheel drive clutch piston 281.

Further, in the tractor 1 of the present embodiment, the first pawls 87a restrict rotation of the claw plates 87 with respect to the four-wheel drive clutch piston 281.

This way, rotation of the claw plates 87 with respect to the four-wheel drive clutch piston 281 can be restricted without a need of separately providing a member for stopping rotation, and therefore the number of components can be made small.

Further, in the tractor 1 of the present embodiment, the cylinder member 80 has an outer cylinder 80b disposed radially outside of the four-wheel drive clutch piston 281. By accommodating the claw plates 87 inside the outer cylinder 80b, the claw plates 87 are retained so as not to dropout from the attachment groove 281d.

This way, the claw plates 87 can be maintained in a state of being inserted into the attachment groove 281d of the four-wheel drive clutch piston 281, without a need of providing a special member, and therefore the number of components can be made small.

Further, in the tractor 1 of the present embodiment, insertion portions 281e are formed in parts of the attachment groove 281d so as to penetrate the bottom of the groove. In these insertion portions 281e, the first pawls 87a are inserted.

This way, the claw plates 87 are positioned and attached in a relatively non-rotatable manner with respect to the four-wheel drive clutch piston 281.

Further, in the tractor 1 of the present embodiment, each of the plurality of identically-shaped claw plates 87 covers an equally-divided part of the outer circumference of the four-wheel drive clutch piston 281, thereby surrounding the entire outer circumference.

This way, the plurality of claw plates 87 can be formed in a common shape, and therefore the manufacturing costs can be suppressed.

Figure 18:
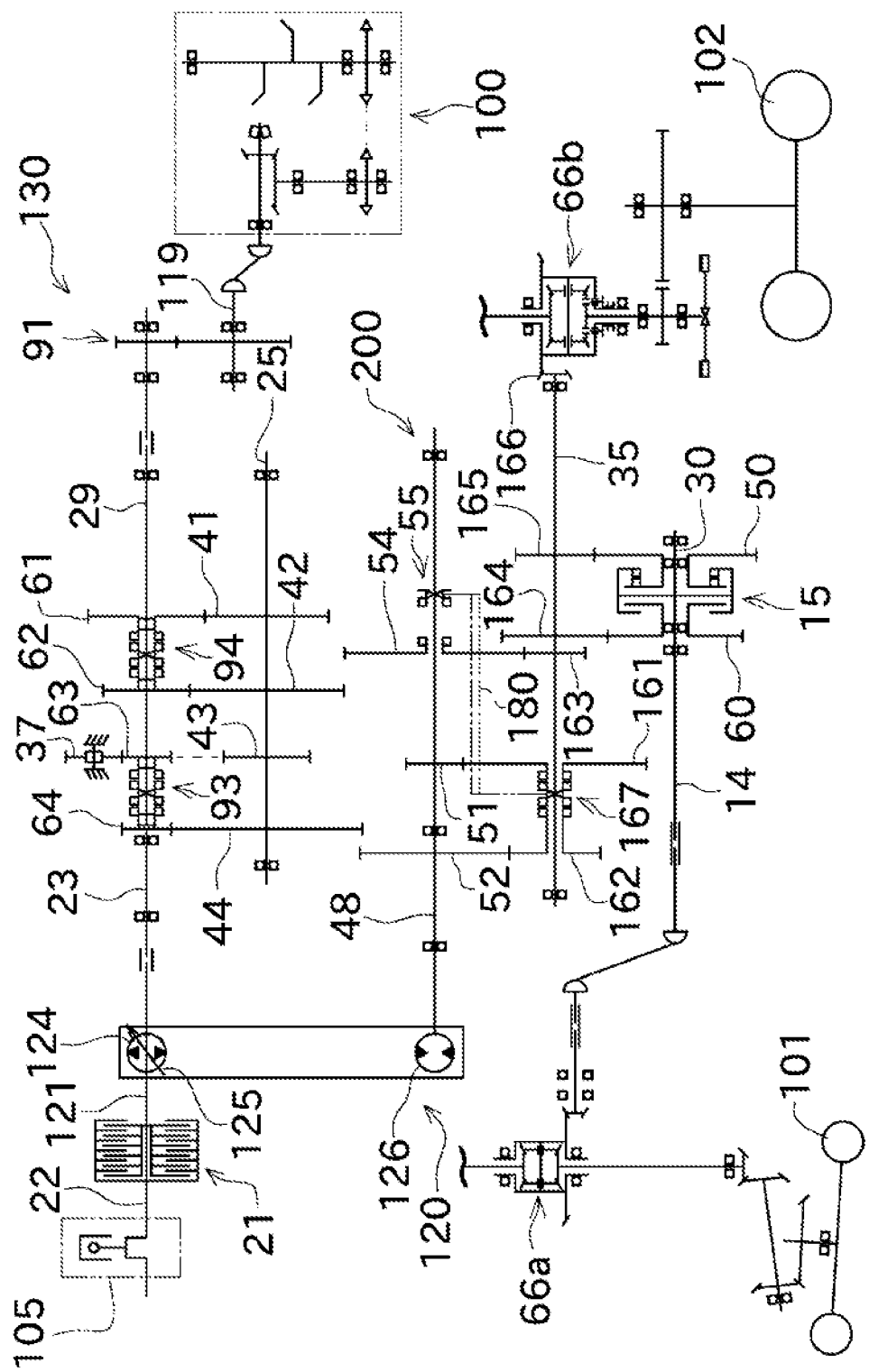
FIG. 18 A power transmission diagram of the tractor related to another embodiment.
Figure 19:
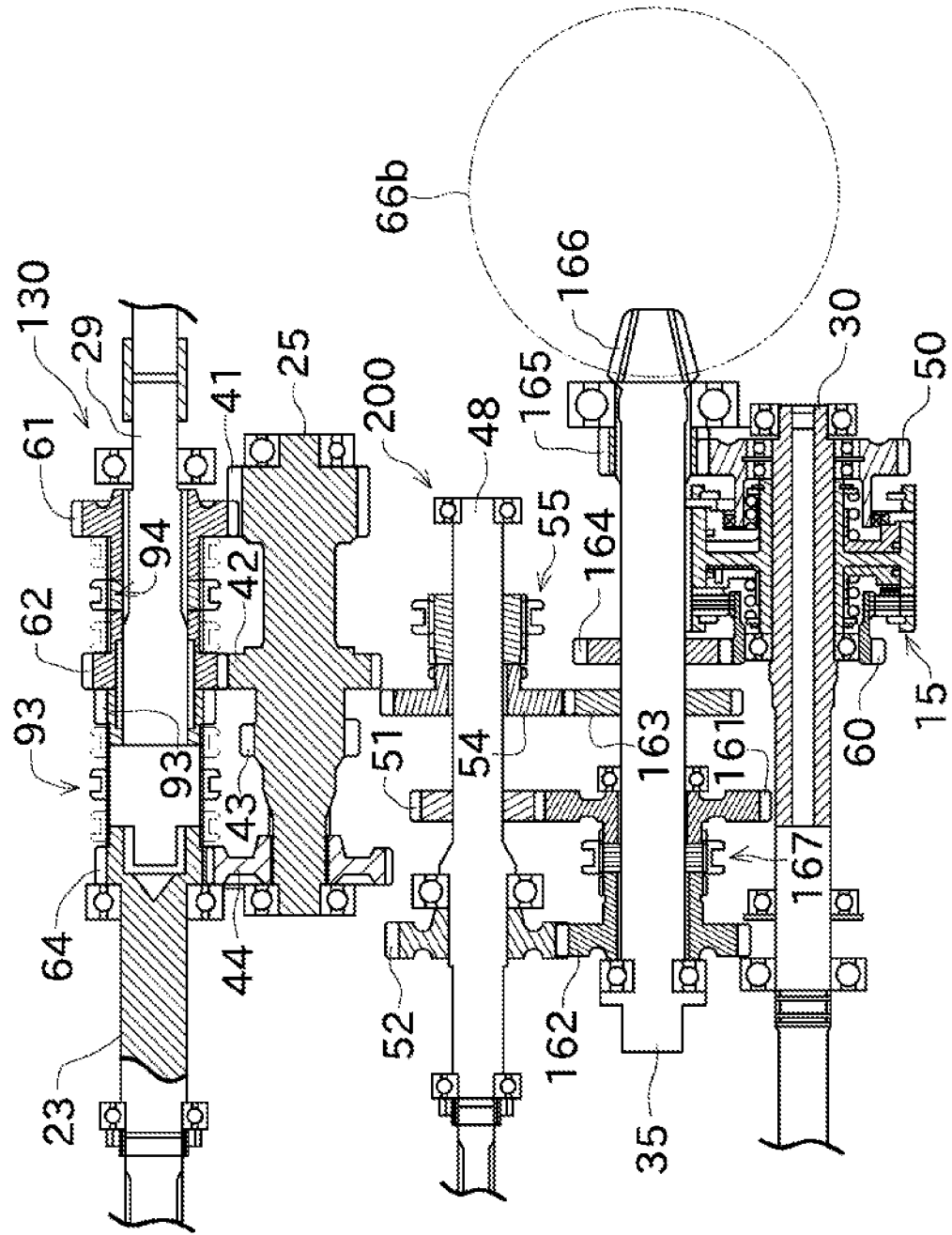
FIG. 19 An exploded cross-sectional view showing a part of a structure of the transmission case.
Figure 20:
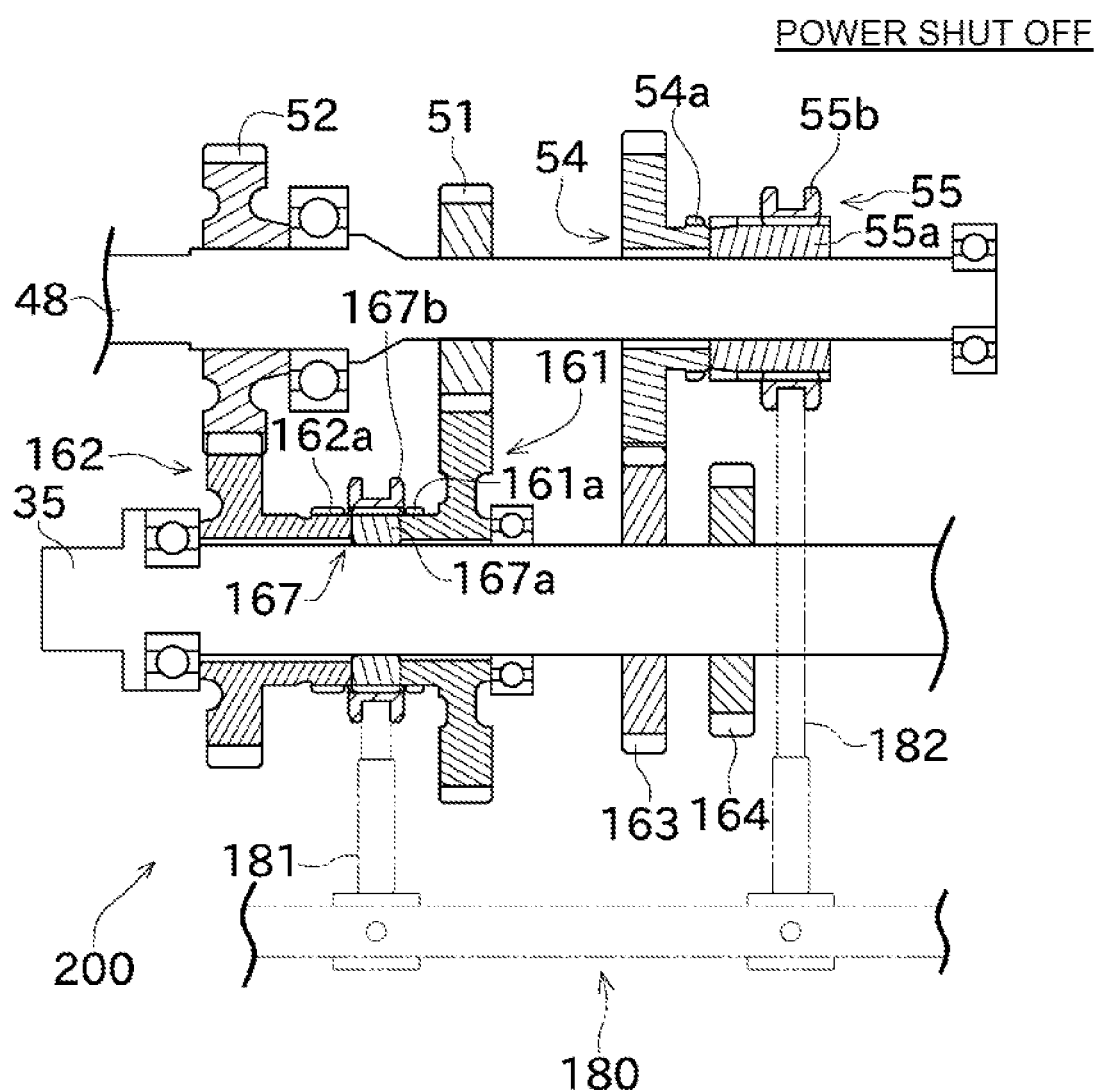
FIG. 20 An exploded cross-sectional view showing a power-shut state in which a sub transmission shaft shifter and a sub transmission shifter are in their reference positions in a sub transmission device, and power is not transmitted.

Next, the following describes characteristics of a sub transmission device 200 related to another embodiment. FIG. 18 is a power transmission diagram of the tractor 1. FIG. 19 is an exploded cross-sectional view showing a part of a structure of the transmission case 103. FIG. 20 is an exploded cross-sectional view showing a power-shut state in which a sub transmission shaft shifter 55 and a sub transmission shifter 167 are in their reference positions in a sub transmission device 200, and power is not transmitted. FIG. 20 to FIG. 24 show states of the sub transmission device 200 which are switched from one another by moving the sub transmission shaft shifter 55 and the sub transmission shifter 167. It should be noted that the structures of the present embodiment other than the sub transmission device 200 are the same as the above-described embodiment, and therefore description of those structures are omitted hereinbelow.

A sub transmission shaft 35 has a sub transmission first-speed gear (first input gear) 161, a sub transmission second-speed gear (third input gear) 162, a sub transmission shaft third gear (second input gear) 163, a sub transmission shaft fourth gear 164, a sub transmission shaft fifth gear 165, and a sub transmission shaft sixth gear 166. The sub transmission first-speed gear 161 and the sub transmission second-speed gear 162 are supported by the sub transmission shaft 35 in a relatively rotatable manner. On the other hand, the sub transmission shaft third gear 163, the sub transmission shaft fourth gear 164, the sub transmission shaft fifth gear 165, and the sub transmission shaft sixth gear 166 are structure so as to integrally rotate with the sub transmission shaft 35.

The sub transmission first-speed gear 161 meshes with a first transmission gear 51 disposed on a transmission shaft 48, and the sub transmission second-speed gear 162 meshes with a second transmission gear 52. Further, the sub transmission shaft third gear 163 meshes with a sub transmission shaft speed-change gear 54.

On the sub transmission shaft 35, a sub transmission shifter 167 is disposed between the sub transmission first-speed gear 161 and the sub transmission second-speed gear 162. The sub transmission shifter 167 is spline-fitted to the sub transmission shaft 35 in such a manner as to be relatively non-rotatable and axially slidable. The sub transmission shifter 167 can be coupled with the sub transmission first-speed gear 161 or the sub transmission second-speed gear 162 in a relatively non-rotatable manner, by moving in the axial direction.

On the transmission shaft 48, a sub transmission shaft shifter (transmission shaft shifter) 55 is disposed in the rear of the sub transmission shaft speed-change gear 54. The sub transmission shaft shifter 55 is spline-fitted to the transmission shaft 48 in such a manner as to be relatively non-rotatable and axially slidable. The sub transmission shaft shifter 55 can be coupled with the sub transmission shaft speed-change gear 54 in a relatively non-rotatable manner, by moving in the axial direction.

The sub transmission shifter 167 and the sub transmission shaft shifter 55 are coupled with a not-shown sub shift lever provided inside a cabin 112 through a later-described fork shaft 180. The operator can operate the sub shift lever to move the sub transmission shifter 167 and the sub transmission shaft shifter 55 in the axial direction, thereby performing switching amongst a state where the sub transmission shifter 167 is coupled with the sub transmission first-speed gear 161, a state where the sub transmission shifter 167 is coupled with the sub transmission second-speed gear 162, and a state where the sub transmission shaft shifter 55 is coupled with the sub transmission shaft speed-change gear 54, so that the sub transmission shaft 35 receive rotation whose speed is changeable in three stages.

In the sub transmission device 200 of the present embodiment, the velocity stage is switched from one another, by integrally moving two gear change shifters provided on different shafts, to perform switching between transmitting state/shut-off state of power from clutches on the two shafts in an interlocking manner. That is, the velocity stage is switched by moving, in an interlocking manner, the sub transmission shaft shifter 55 disposed on the transmission shaft 48, and the sub transmission shifter 167 on the sub transmission shaft 35.

The sub transmission shifter 167 is attached to the sub transmission shaft 35 in a position between the sub transmission first-speed gear 161 and the sub transmission second-speed gear 162. As shown in FIG. 20, the sub transmission shifter 167 has a short cylindrical clutch hub 167a fixed to integrally rotate with the sub transmission shaft 35, and a ring-shape slider 167b disposed on the outside of the clutch hub 167a. On the outer circumference of the clutch hub 167a, splines are formed.

The slider 167b has substantially the same dimension as the clutch hub 167a relative to the axial direction. On the inner circumference of the slider 167b, inner spline teeth corresponding to the splines on the outer circumference of the clutch hub 167a are formed. With the splines of the clutch hub 167a meshed with the inner spline teeth on the slider 167a, the slider 167b and the clutch hub 167a are integrally rotated. Further, with the above spline coupling, the slider 167b can slide in the axial direction of the sub transmission shaft 35 with respect to the clutch hub 167a.

The sub transmission first-speed gear 161 is disposed on one side of the clutch hub 167a relative to the axial direction, and the sub transmission second-speed gear 162 is disposed on the other side. The sub transmission first-speed gear 161 and the sub transmission second-speed gear 162 are supported in a relatively rotatable manner with respect to the sub transmission shaft 35. The sub transmission first-speed gear 161 meshes with the first transmission gear 51 fixed to the transmission shaft 48, and the sub transmission second-speed gear 162 meshes with the second transmission gear 52. The gear ratio of a gear train including the first transmission gear 51 and the sub transmission first-speed gear 161 is different from the gear ratio of a gear train including the second transmission gear 52 and the sub transmission second-speed gear 162.

The sub transmission first-speed gear 161 and the sub transmission second-speed gear 162 each have a boss part protruding in a direction towards the clutch hub 167a. On an outer circumference of an end portion of the boss part of the sub transmission first-speed gear 161 close to the clutch hub 167a, an engagement part 161a having spline teeth is formed. Similarly, on an outer circumference of an end portion of the boss part of the sub transmission second-speed gear 162 close to the clutch hub 167a, an engagement part 162a having spline teeth is formed. The splines of the engagement part 161a of the sub transmission first-speed gear 161 and the splines of the engagement part 162a of the sub transmission second-speed gear 162 can mesh with the inner spline teeth formed on the slider 167b.

Figure 21:
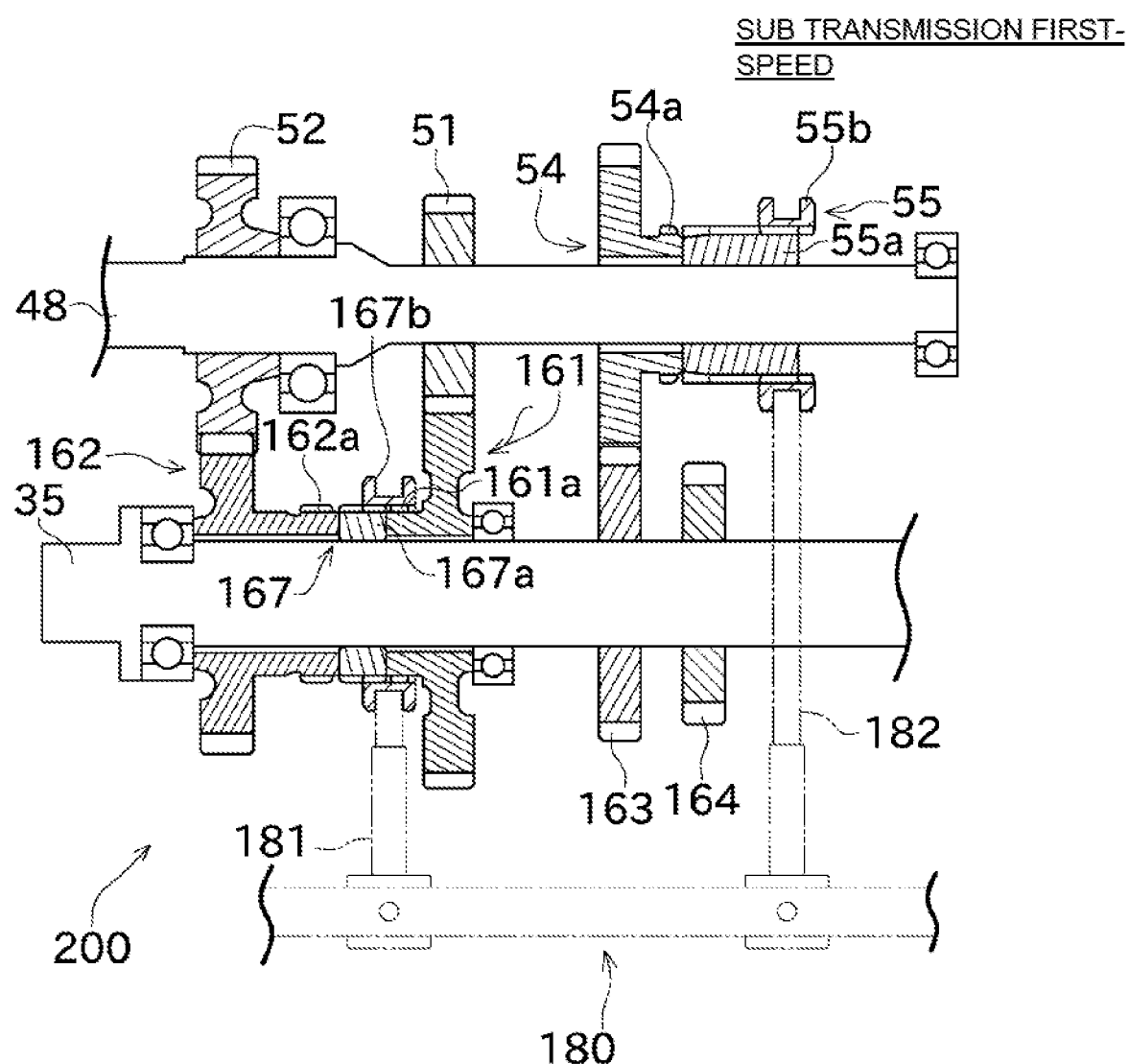
FIG. 21 An exploded cross-sectional view showing the sub transmission device in a state of a sub transmission first-speed.
Figure 22:
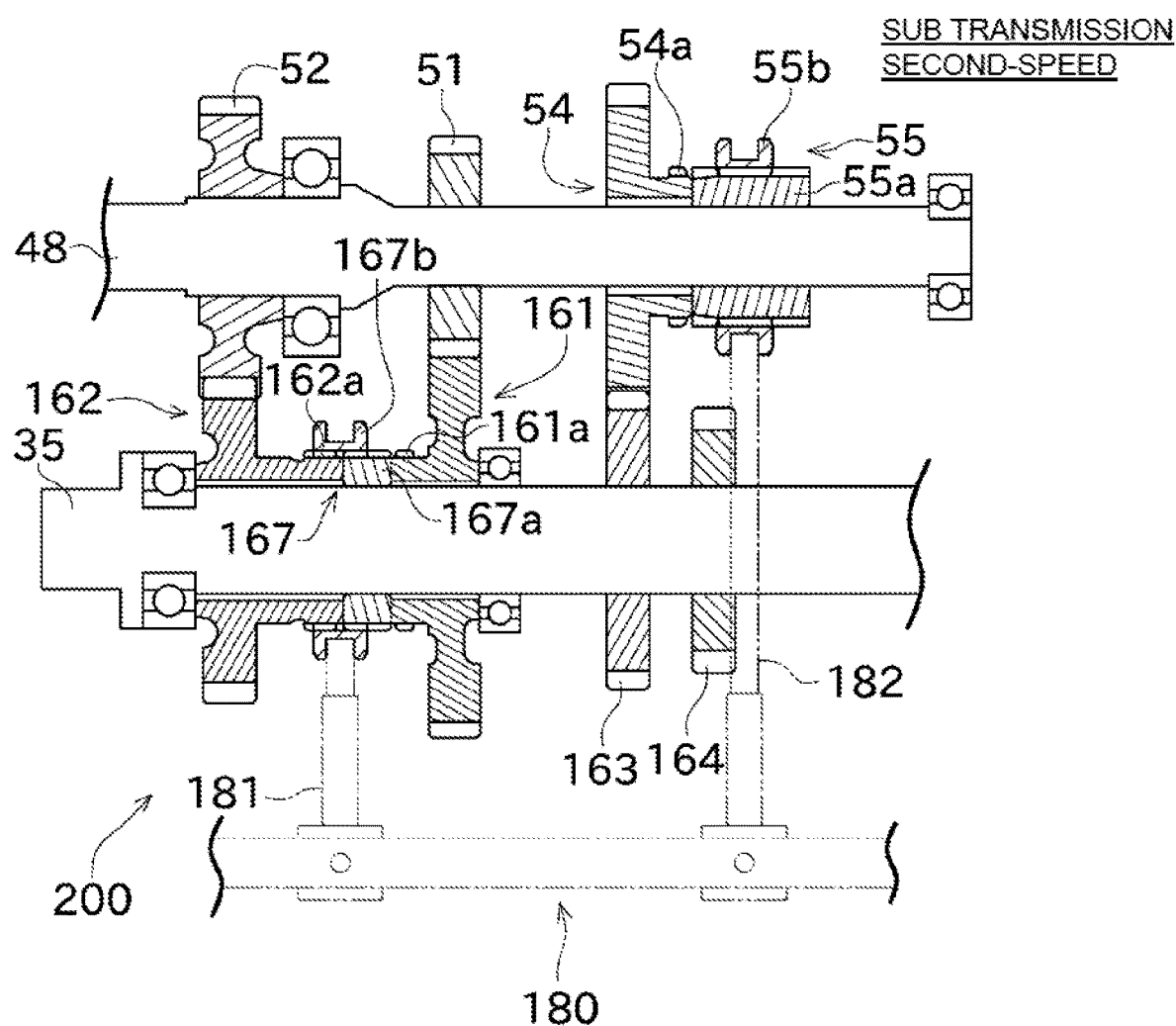
FIG. 22 An exploded cross-sectional view showing the sub transmission device in a state of a sub transmission second-speed.

With this structure, while the slider 167b is positioned so as not to substantially protrude from the clutch hub 167a relative to the axial direction as shown in FIG. 20, the slider 167b is coupled with neither the engagement part 161a of the sub transmission first-speed gear 161 nor the engagement part 162a of the sub transmission second-speed gear 162. Therefore, rotation of the transmission shaft 48 is not transmitted to the sub transmission shaft 35. On the other hand, while the slider 167b is positioned so as to bridge across the clutch hub 167a and the engagement part 161a of the sub transmission first-speed gear 161 as shown in FIG. 21, the sub transmission first-speed gear 161 and the clutch hub 167a are coupled with each other in a relatively non-rotatable manner through the slider 167b. Therefore, rotation of the sub transmission first-speed gear 161 is transmitted to the sub transmission shaft 35. Further, while the slider 167b is positioned so as to bridge across the clutch hub 167a and the engagement part 162a of the sub transmission second-speed gear 162 as shown in FIG. 22, the sub transmission second-speed gear 162 and the clutch hub 167a are coupled with each other in a relatively non-rotatable manner through the slider 167b. Therefore, rotation of the sub transmission second-speed gear 162 is transmitted to the sub transmission shaft 35.

It should be noted that, the dimension of the boss part of the sub transmission second-speed gear 162 relative to the axial direction is slightly longer than the clutch hub 167a, as shown in FIG. 20 and the like. This way, the slider 167b can be also moved to a position (position shown in FIG. 23 or FIG. 24) where the slider 167b meshes only with the engagement part 162a of the sub transmission second-speed gear 162. In this case, since the slider 167b is disengaged with the clutch hub 167a, rotation of the sub transmission second-speed gear 162 is not transmitted to the sub transmission shaft 35.

The sub transmission shaft shifter 55 is attached to the transmission shaft 48 on one side of the sub transmission shaft speed-change gear 54 relative to the axial direction. As shown in FIG. 20, the sub transmission shaft shifter 55 has a cylindrical clutch hub 55a fixed to integrally rotate with the transmission shaft 48, and a ring-shape slider 55b disposed on the outside of the clutch hub 55a. On the outer circumference of the clutch hub 55a, splines are formed.

The slider 55b has a shorter dimension as the clutch hub 55a relative to the axial direction. On the inner circumference of the slider 55b, inner spline teeth corresponding to the splines on the outer circumference of the clutch hub 55a are formed. With the splines of the clutch hub 55a meshed with the inner spline teeth on the slider 55a, the slider 55b and the clutch hub 55a are integrally rotated. Further, with the above spline coupling, the slider 55b can slide in the axial direction of the transmission shaft 48 with respect to the clutch hub 55a.

The sub transmission shaft speed-change gear 54 is disposed on one side of the clutch hub 55a relative to the axial direction (specifically, on the same side as the sub transmission second-speed gear 162 with respect to the clutch hub 167a on the sub transmission shaft 35). The sub transmission shaft speed-change gear 54 is supported in a relatively rotatable manner with respect to the transmission shaft 48. Further, sub transmission shaft speed-change gear 54 meshes with the sub transmission shaft third gear 163 which is fixed to the sub transmission shaft 35 and which integrally rotates with the sub transmission shaft 35. The gear ratio of a gear train including the sub transmission shaft speed-change gear 54 and the sub transmission shaft third gear 163 is different from the gear ratio of a gear train including the first transmission gear 51 and the sub transmission first-speed gear 161, and the gear ratio of a gear train including the second transmission gear 52 and the sub transmission second-speed gear 162.

The sub transmission shaft speed-change gear 54 has a boss part protruding in a direction towards the clutch hub 55a. On an outer circumference of an end portion of the boss part of the sub transmission shaft speed-change gear 54 close to the clutch hub 55a, an engagement part 54a having spline teeth is formed. The splines of the engagement part 54a of the sub transmission shaft speed-change gear 54 can mesh with the inner spline teeth formed on the slider 55b.

With this structure, while the slider 55b is positioned so as not to protrude from the clutch hub 55a towards the sub transmission shaft speed-change gear 54 relative to the axial direction as shown in FIG. 20 to FIG. 23, the slider 55b is not coupled with engagement part 54a of the sub transmission shaft speed-change gear 54. Therefore, rotation of the transmission shaft 48 is not transmitted to the sub transmission shaft speed-change gear 54 (nor is it transmitted to the sub transmission shaft third gear 163 or the sub transmission shaft 35). On the other hand, while the slider 55b is positioned so as to bridge across the clutch hub 55a and the engagement part 54a of the sub transmission shaft speed-change gear 54 as shown in FIG. 24, the sub transmission shaft speed-change gear 54 and the clutch hub 55a are coupled with each other in a relatively non-rotatable manner through the slider 55b. Therefore, rotation of the transmission shaft 48 is transmitted to the sub transmission shaft speed-change gear 54 (and in turn, to the sub transmission shaft third gear 163 and the sub transmission shaft 35).

The slider 167b of the sub transmission shifter 167 is attached to a leading end of a shift fork 181. Further, the slider 55b of the sub transmission shaft shifter 55 is attached to a leading end of a shift fork 182. The two shift forks 181, 182 are fixed to one common fork shaft 180. The fork shaft 180 is disposed so as to be parallel to the sub transmission shaft 35 and the transmission shaft 48 and is supported movably in a predetermined stroke in the axial direction.

The fork shaft 180 can be moved in the axial directions by the operator operating the sub shift lever. As a result, the slider 167b of the sub transmission shifter 167 and the slider 55b of the sub transmission shaft shifter 55 linearly move while maintaining their mutual positional relationship. As described, since the sliders 167b and 55b are coupled through the fork shaft 180, while the slider 167b of the sub transmission shifter 167 is in the positions of FIG. 20 to FIG. 24, the slider 55b of the sub transmission shaft shifter 55 is also in the positions of FIG. 20 to FIG. 24, respectively.

Since the sliders 167b and 55b move in an interlocking manner with the above-described positional relationship, while the slider 167b of the sub transmission shifter 167 is positioned so as not to substantially protrude from the clutch hub 167a relative to the axial direction as shown in FIG. 20, the slider 55b of the sub transmission shaft shifter 55 is positioned so as not to substantially protrude towards the sub transmission shaft speed-change gear 54, from the clutch hub 55a formed slightly long relative to the axial direction. Therefore, during this state, rotation of the transmission shaft 48 is not transmitted to the sub transmission shaft speed-change gear 54 (nor is it transmitted to the sub transmission shaft third gear 163 or the sub transmission shaft 35). The same goes for a state where the slider 167b of the sub transmission shifter 167 is positioned so as to bridge across the clutch hub 167a and the engagement part 161a of the sub transmission first-speed gear 161 (FIG. 21), and a state where the slider 167b is positioned so as to bridge across the clutch hub 167a and the engagement part 162a of the sub transmission second-speed gear 162 (FIG. 22).

On the other hand, while the slider 55b of the sub transmission shaft shifter 55 is positioned so as to bridge across the clutch hub 55a and the engagement part 54a of the sub transmission shaft speed-change gear 54 as shown in FIG. 24, the slider 167b of the sub transmission shifter 167 is disengaged from the clutch hub 167a, and is positioned on the boss part of the sub transmission second-speed gear 162, which part is formed slightly long in the axial direction. Therefore, during this state, neither rotation of the sub transmission first-speed gear 161 nor rotation of the sub transmission second-speed gear 162 is transmitted to the sub transmission shaft 35.

As described above, a coupling position and a disengagement position are determined for each of the sliders 167b and 55b in such a manner that the sub transmission shifter 167 and the sub transmission shaft shifter 55 simultaneously transmit power. Therefore, a simple power transmission structure can be achieved.

Figure 23:
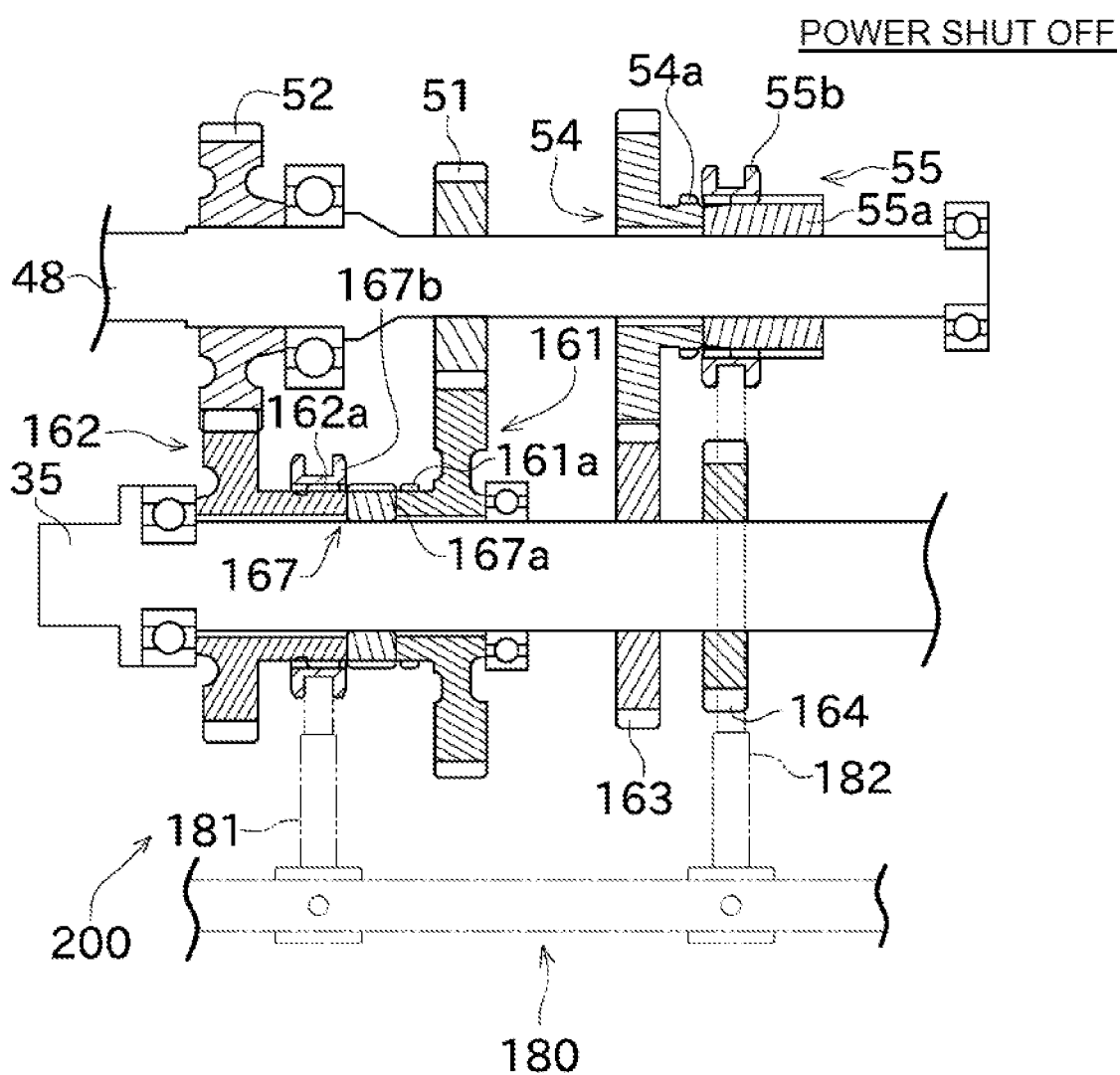
FIG. 23 An exploded cross-sectional view showing a power-shut state of the sub transmission device, in which a sub transmission shaft shifter and a sub transmission shifter are in different positions from those of FIG. 20.
Figure 24:
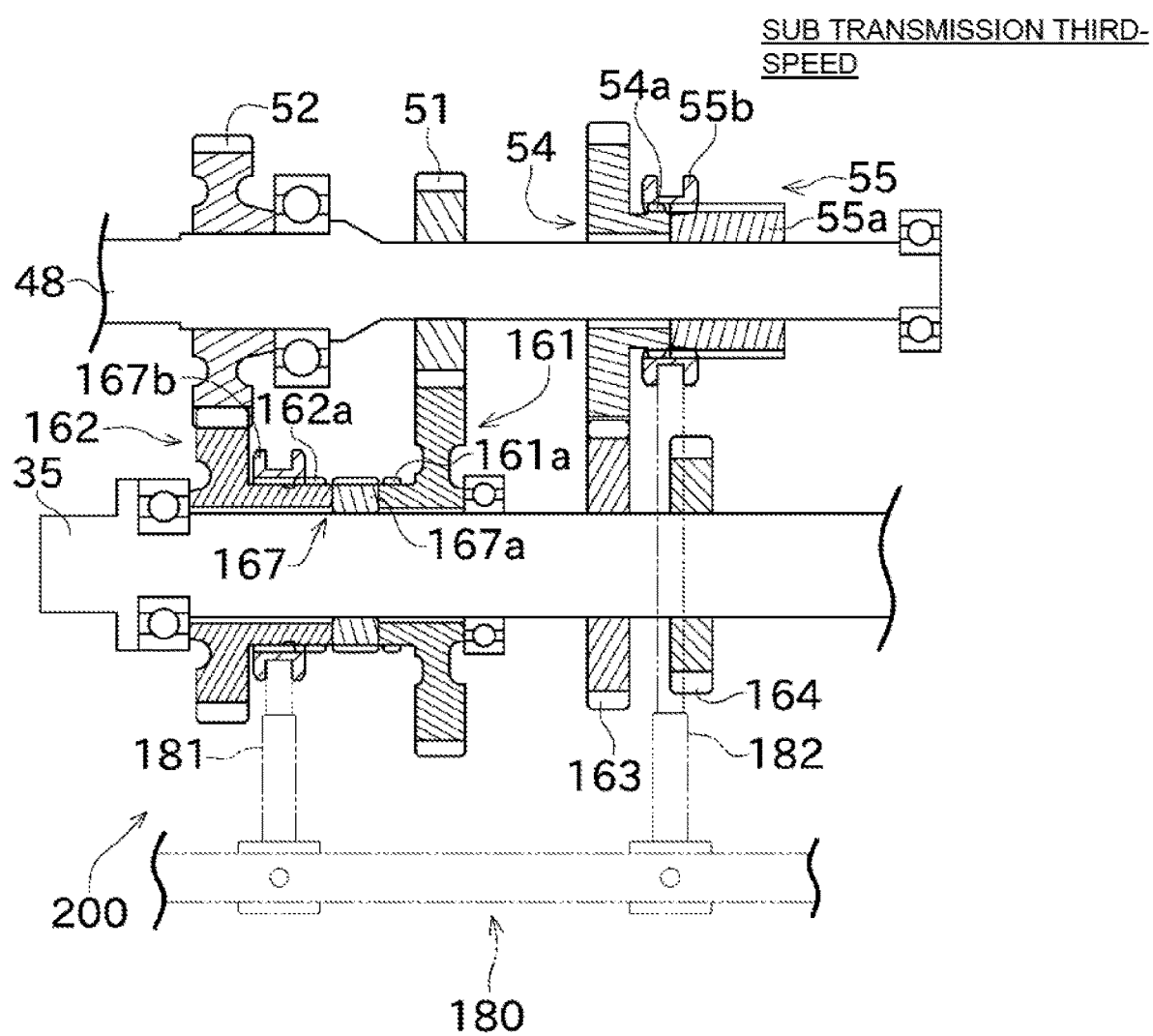
FIG. 24 An exploded cross-sectional view showing the sub transmission device in a state of a sub transmission third-speed.

It should be noted that, between positions of the sub transmission shifter 167 and the sub transmission shaft shifter 55 shown in FIG. 22 and FIG. 24, there are positions as shown in FIG. 23 where the slider 167b of the sub transmission shifter 167 is disengaged from the clutch hub 167a, and where the slider 55b of the sub transmission shaft shifter 55 is not coupled with the engagement part 54a of the sub transmission shaft speed-change gear 54. During this state of FIG. 23, power of the transmission shaft 48 is not transmitted to the sub transmission shaft 35, as in the state of FIG. 20.

Next, the following describes three gear speeds achieved by the above sub transmission device 200: i.e., sub transmission first-speed (first state), a sub transmission second-speed (third state), and a sub transmission third-speed (second state).

First, the power-shut state is described. While the operator positions the sub shift lever in the neutral, the slider 167*b* of the sub transmission shifter 167 and the slider 55*b* of the sub transmission shaft shifter 55 are in their reference positions as shown in FIG. 20. Rotation of the transmission shaft 48 is not transmitted to the sub transmission shaft 35 during this state.

While the operator positions the sub shift lever in the first-speed (sub transmission first-speed), the slider 167*b* of the sub transmission shifter 167 and the slider 55*b* of the sub transmission shaft shifter 55 are positioned as shown in FIG. 21. This way, the slider 167*b* bridges across the clutch hub 167*a* and the engagement part 161*a* of the sub transmission first-speed gear 161 and coupling them with each other. Therefore, rotation of the sub transmission first-speed gear 161 is transmitted to the sub transmission shaft 35 through the sub transmission shifter 167.

While the operator positions the sub shift lever in the second-speed (sub transmission second-speed), the slider 167*b* of the sub transmission shifter 167 and the slider 55*b* of the sub transmission shaft shifter 55 are positioned as shown in FIG. 22. This way, the slider 167*b* bridges across the clutch hub 167*a* and the engagement part 162*a* of the sub transmission second-speed gear 162 and coupling them with each other. Therefore, rotation of the sub transmission second-speed gear 162 is transmitted to the sub transmission shaft 35 through the sub transmission shifter 167.

While the operator positions the sub shift lever in the third-speed (sub transmission third-speed), the slider 167*b* of the sub transmission shifter 167 and the slider 55*b* of the sub transmission shaft shifter 55 are positioned as shown in FIG. 24. This way, the slider 55*b* bridges across the clutch hub 55*a* and the engagement part 54*a* of the sub transmission shaft speed-change gear 54 and coupling them with each other. Therefore, rotation of the transmission shaft 48 is transmitted to the sub transmission shaft speed-change gear 54 (and to the sub transmission shaft third gear 163 and the sub transmission shaft 35) through the sub transmission shaft shifter 55.

It should be noted that, when the sub transmission second-speed and the sub transmission third-speed switched from one another, the slider 167*b* of the sub transmission shifter 167 and the slider 55*b* of the sub transmission shaft shifter 55 pass the positions shown in FIG. 23. In the state of FIG. 23, rotation of the transmission shaft 48 is not transmitted to the sub transmission shaft 35.

Thus, by moving the fork shaft 180 from one end to the other end of its stroke, the state of the sub transmission device 200 of the present embodiment can be switched sequentially from the sub transmission first-speed (FIG. 21), the power-shut state corresponding to the neutral (FIG. 20), the sub transmission second-speed (FIG. 22), the power-shut state (FIG. 23), and the sub transmission third-speed (FIG. 24). Thus, a natural linear speed change can be achieved.

Further, in the sub transmission device 200 of the present embodiment having the above-described structure, a slide distance of the shifter of each shaft (i.e., the sub transmission shifter 167 and the sub transmission shaft shifter 55) can be shortened. Therefore, a compact structure can be achieved and the degree of freedom in arrangement of the shifters can be improved.

It should be noted that, depending on an application and the like of the work vehicle, acceleration may be required in the sub transmission third-speed (FIG. 24) which is a high-velocity stage. In order to cope with this requirement, the sub transmission shaft speed-change gear 54 needs to be enlarged, while downsizing the sub transmission shaft third gear 163 which is the gear on the driven side. In this regard, in the present embodiment, the sub transmission shaft shifter 55 for switching to the sub transmission third-speed which is a high-velocity stage is provided on the transmission shaft 48 (shaft on the driving side). Accordingly, there is no need of providing spline teeth (engagement part) on the sub transmission shaft third gear 163 whose diameter needs to be downsized, and the engagement part 54*a* on the side of the sub transmission shaft speed-change gear 54 will suffice the requirement. Therefore, machining of the spline teeth is made easy and the cost reduction can be achieved.

As hereinabove described, the sub transmission device 200 of the present embodiment includes a transmission shaft 48, a sub transmission shaft 35, a first transmission gear 51, a sub transmission first-speed gear 161, a sub transmission shaft speed-change gear 54, a sub transmission shaft third gear 163, a sub transmission shaft shifter 55, a sub transmission shifter 167, and a fork shaft 180. To the transmission shaft 48, power from the hydraulic continuously variable transmission 120 is transmitted. To the sub transmission shaft 35, power of the transmission shaft 48 is transmitted in a speed-changing manner. The first transmission gear 51 integrally rotates with the transmission shaft 48. The sub transmission first-speed gear 161 meshes with the first transmission gear 51 and is supported by the sub transmission shaft 35 in such a manner as to be relatively rotatable. The sub transmission shaft speed-change gear 54 is supported in a relatively rotatable manner with respect to the transmission shaft 48. The sub transmission shaft third gear 163 meshes with the sub transmission shaft speed-change gear 54 and integrally rotates with the sub transmission shaft 35. The sub transmission shaft shifter 55 is disposed on the transmission shaft 48. The sub transmission shifter 167 is disposed on the sub transmission shaft 35. The fork shaft 180 moves the sub transmission shaft shifter 55 and the sub transmission shifter 167 in an interlocking manner. The sub transmission shaft shifter 55 has inner spline teeth to make it relatively non-rotatable and axially slidable with respect to the transmission shaft 48. The sub transmission shifter 167 has inner spline teeth to make it relatively non-rotatable and axially slidable with respect to the sub transmission shaft 35. The sub transmission first-speed gear 161 has an engagement part 161*a* which can mesh with the inner spline teeth of the sub transmission shifter 167. The sub transmission shaft speed-change gear 54 has an engagement part 54*a* which can mesh with the inner spline teeth of the sub transmission shaft shifter 55. The sub transmission device 200 is structured so that switching is possible between the sub transmission first-speed and the sub transmission third-speed by sliding the fork shaft 180 in the axial direction. In the sub transmission first-speed (FIG. 21), the sub transmission shifter 167 couples the engagement part 161*a* of the sub transmission first-speed gear 161 with the sub transmission shaft 35 in a in a relatively non-rotatable manner, and the sub transmission shaft shifter 55 does not couple the sub transmission shaft speed-change gear 54 with the transmission shaft 48. In the sub transmission third-speed (FIG. 24), the sub transmission shifter 167 does not couple the sub transmission first-speed gear 161 with the sub transmission shaft 35, and the sub transmission shaft shifter 55 couples the engagement part 54*a* of the sub transmission shaft speed-change gear 54 with the transmission shaft 48 in a relatively non-rotatable manner. The sub transmission third-speed is a higher velocity stage than the sub transmission first-speed.

Since coupling of the sub transmission first-speed gear 161 with the sub transmission shifter 167 and coupling of the sub transmission shaft speed-change gear 54 with the sub transmission shaft shifter 55 are achieved by engagement of the engagement part formed on each gear with the inner spline teeth of the shifter, linear shifting is achieved and the structure of each shifter can be simplified. Further, even in cases where acceleration at the sub transmission third-speed is desired, there is no particular need for making the engagement part compact, because the engagement part 54a is formed on the sub transmission shaft speed-change gear 54 (whose diameter should be enlarged) on the driving side. Therefore, the degrees of freedom in setting the reduction ratio and layout are improved. Further, by providing two shifters (the sub transmission shifter 167 and the sub transmission shaft shifter 55) on different shafts respectively, the slide distance of each shifter is shortened as compared with a structure in which a single shifter is provided. Therefore, downsizing of the sub transmission device 200 in the axial direction can be achieved.

Further, the sub transmission device 200 of the present embodiment includes a second transmission gear 52 and a sub transmission second-speed gear 162. The second transmission gear 52 integrally rotates with the transmission shaft 48. The sub transmission second-speed gear 162 meshes with the second transmission gear 52 and is supported by the sub transmission shaft 35 in such a manner as to be relatively rotatable. The sub transmission second-speed gear 162 has an engagement part 162a which can mesh with the inner spline teeth of the sub transmission shifter 167. The sub transmission device 200 is structured so as to enable switching to the sub transmission second-speed (FIG. 22) in which the sub transmission shifter 167 couples the engagement part 162a of the sub transmission second-speed gear 162 with the sub transmission shaft 35 in a in a relatively non-rotatable manner, and the sub transmission shaft shifter 55 does not couple the sub transmission shaft speed-change gear 54 with the transmission shaft 48, by sliding the fork shaft 180 in the axial direction.

Thus, switching amongst three or more velocity stages can be achieved through linear shifting. Further, unlike a structure in which switching of three velocity stages is achieved by providing a member serving as a shifter and a gear on a single shaft, the structure of each of the shifters (the sub transmission shifter 167 and the sub transmission shaft shifter 55) are simplified. Therefore, manufacturing of components becomes easy and the costs can be reduced.

Further, by sliding the fork shaft 180 of the sub transmission device 200 of the present embodiment in the axial direction so that the velocity stage is raised sequentially from the one side (first-speed, second-speed, third-speed), switching amongst the sub transmission first-speed, the sub transmission third-speed, and the sub transmission second-speed is possible.

Thus, a natural sub transmission operation can be achieved.

Figure 25:
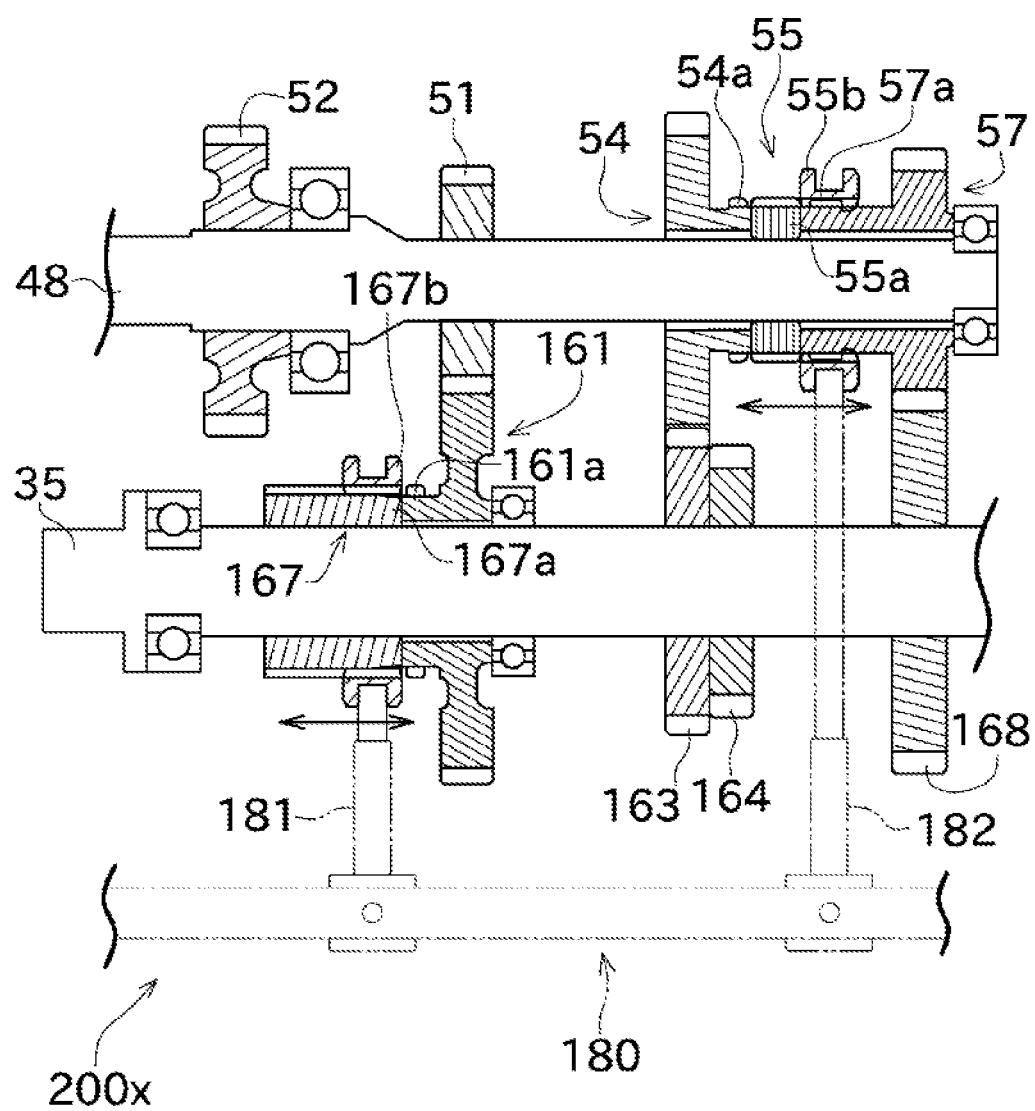
FIG. 25 An exploded cross-sectional view showing a power-shut state in which a sub transmission shaft shifter and a sub transmission shifter are in their reference positions in a sub transmission device of a modification, and power is not transmitted.

Next, the following describes a modification of the present embodiment with reference to FIG. 25. FIG. 25 is an exploded cross-sectional view showing a power-shut state in which a sub transmission shaft shifter 55 and a sub transmission shifter 167 are in their reference positions in a sub transmission device 200x of the modification, and power is not transmitted. In the description of the modification, parts that are identical or similar to those of the above-described embodiment are given identical reference numerals in the drawings, and description of these parts may be omitted.

In the sub transmission device 200x of the present modification shown in FIG. 25, a sub transmission shaft shifter 55 disposed on a transmission shaft 48 has a gear on its both ends relative to the axial direction, and a sub transmission shifter 167 disposed on a sub transmission shaft 35 has a gear only one of its side relative to the axial direction.

Specifically, a sub transmission shaft speed-change gear 54 is disposed on one side of the sub transmission shaft shifter 55 relative to the axial direction, and a sub transmission shaft second-speed gear (second output gear) 57 is disposed on the other end. The sub transmission shaft second-speed gear 57 is supported in a relatively rotatable manner with respect to the transmission shaft 48, as in the case of the sub transmission shaft speed-change gear 54. To the sub transmission shaft 35, the sub transmission second-speed gear (second input gear) 168 is fixed, and the sub transmission shaft second-speed gear 57 is meshed with the sub transmission second-speed gear 168 The sub transmission shaft second-speed gear 57 has a boss part which protrudes towards a clutch hub 55a of the sub transmission shaft shifter 55. On the outer circumference of the boss part, an engagement part 57a is formed which has spline teeth which can mesh with the inner spline teeth formed on a slider 55b of the sub transmission shaft shifter 55.

Meanwhile, the sub transmission second-speed gear 162 disposed on one side of the sub transmission shifter 167 relative to the axial direction in the above-described embodiment is omitted in the present modification.

In the present modification, coupling the slider 167b of the sub transmission shifter 167 with the sub transmission first-speed gear 161 switches to the sub transmission first-speed, coupling the slider 55b of the sub transmission shaft shifter 55 with the sub transmission shaft second-speed gear 57 switches to the sub transmission second-speed, coupling the slider 55b of the sub transmission shaft shifter 55 with the sub transmission shaft speed-change gear 54 switches to the sub transmission third-speed. Thus, in the present modification too, three-stage sub transmission can be achieved by moving the sub transmission shifter 167 and the sub transmission shaft shifter 55 in an interlocking manner through the fork shaft 180.

As hereinabove described, the sub transmission device 200x of the present modification includes a sub transmission shaft second-speed gear 57 and a sub transmission second-speed gear 168. The sub transmission shaft second-speed gear 57 is supported in a relatively rotatable manner with respect to the transmission shaft 48. The sub transmission second-speed gear 168 meshes with the sub transmission shaft second-speed gear 57 and integrally rotates with the sub transmission shaft 35. The sub transmission shaft second-speed gear 57 has an engagement part 57a which can mesh with the inner spline teeth of the sub transmission shaft shifter 55. The sub transmission device 200x is structured so as to enable switching to the sub transmission second-speed in which the sub transmission shaft shifter 55 couples with the engagement part 57a of the sub transmission shaft second-speed gear 57, and the sub transmission shifter 167 does not couple the sub transmission first-speed gear 161 with the sub transmission shaft 35, by sliding the fork shaft 180 in the axial direction.

Thus, switching amongst three or more velocity stages can be achieved through linear shifting. Further, unlike a structure in which switching of three velocity stages is achieved by providing a member serving as a shifter and a gear on a single shaft, the structure of each of the shifters is simplified. Therefore, manufacturing of components becomes easy and the costs can be reduced.

Although a preferred embodiment of the present invention has been described above, the above-described configuration can be modified, for example, as follows.

In the above embodiment, the electric cylinder 143 is used as the electric actuator for driving the trunnion arm 78. However, other actuators can be used as long as the inclination angle of the movable swash plate 125 can be changed by electrical driving.

In the above embodiment, the potentiometer 146 is used as the inclination angle detection unit; however, the inclination angle detection unit is not limited to a rotation sensor, and a structure that detects a slide amount of a member connected to the movable swash plate 125 may be adopted.

In the above embodiment, the front wheels 101 and the rear wheels 102 are adopted as the traveling unit; however, the traveling unit may be crawlers and the like. In this case too, the virtual line L1 is a rectilinear line that passes the center portion of the crawlers relative to the vertical direction, in side view, as in the above-described embodiment.

The power transmission mechanism 70 shown in the above embodiment is an example, and the type, the number, the arrangement, and the like of the mechanical elements can be suitably changeable.

In the above embodiment, the gear 19 is fixed to the sub transmission shaft 35 serving as a shaft for changing speed. However, instead of this structure, the gear 19 may be integrally formed with the sub transmission shaft 35.

In the above embodiment, the rotary power of the sub transmission shaft 35 serving as a shaft for changing speed is transmitted to the drive input gear 50. However, instead of this, the rotary power of the transmission shaft 48 may be transmitted to the drive input gear 50.

In the above embodiment, the two-wheel/four-wheel drive switching mechanism 15 is structured so as to be capable of switching amongst the front wheel acceleration mode, the two-wheel drive mode and the four-wheel drive mode. However, the above-described friction type clutch 95 may be omitted so that switching is performed only between the two-wheel drive mode and the four-wheel drive mode. In this case, the partition wall 80e can be disposed at the front end of the cylinder member 80.

In the above embodiment, a plurality of spline-like grooves 80c each having a bottom are formed on the outer cylinder 80b of the cylinder member 80 in such a manner as to correspond to the second pawls 87b of the claw plates 87. However, the groove may be modified so as to penetrates the outer cylinder 80b in radial directions.

In the above embodiment, each of the plurality of claw plates 87 are attached to the four-wheel drive clutch piston 281 in such a manner as to cover an equally-divided part of the outer circumference of the four-wheel drive clutch piston 281, thereby surrounding the entire outer circumference. However, the present invention is not limited to this, and for example, it is possible to structure the claw plates 87 in arc shapes of different angles, and assembling these may surround the entire outer circumference of the four-wheel drive clutch piston 281.

Each of the insertion portions 281e may be formed as a through hole penetrating in a radial direction, instead of forming as a notch opening one side of the axial direction as in the above embodiment.

Instead of providing three claw plates 87 as in the above embodiment, the number of claw plates 87 provided may be two or four or more.

In the above two embodiments, one of two shifters has a gear on its one side, and the other one of the two shifters has a gear on both sides to implement switching amongst three velocity stages. Instead of this, the two shifters both may be provided with a gear on both sides, thereby enabling switching amongst four velocity stages.

In the above embodiment, the sub transmission device 200 of the embodiment is structured so that the speed is switched sequentially from a low speed to a high speed by sliding the fork shaft 180 from the rear side towards the front side. However, the present invention is not limited to this, and the speed may be sequentially switched from a low speed to a high speed by sliding the fork shaft 180 from the front side to the rear side.

In the above embodiment, the first transmission gear 51, the second transmission gear 52, the sub transmission shaft third gear 163, the sub transmission second-speed gear 168, and the like are structured as separate members fixed on the shaft. However, instead of this, these gears may be integrally formed on the transmission shaft 48 or the sub transmission shaft 35.

The sub transmission operation tool for operating the fork shaft 180 is not limited to a lever.

The main transmission device may be structured as a gear type transmission, instead of the hydraulic continuously variable transmission 120 of the above embodiment.

The present invention is applicable to a work vehicle other than a tractor (e.g. rice transplanter, and the like).

REFERENCE SIGNS LIST

1 tractor (work vehicle)
2 body
70 power transmission mechanism
108 reverser lever (switch operation unit)
109 main shift lever
120 hydraulic continuously variable transmission
141 reverser lever position detection unit (switching operation detection unit)
142 main shift lever position detection unit
143 electric cylinder (electric actuator)
145 battery
146 potentiometer (inclination angle detection unit)

The invention claimed is:
1. A work vehicle, comprising:
an engine;
a battery;
an electric actuator configured to be driven by electric power supplied from the battery at least while the engine is stopped, the electric actuator includes a motor and an expansion/contraction part configured to expand and contract based on an output of the motor;
a hydraulic continuously variable transmission configured to change an output of the engine and change an inclination angle of a movable swash plate to change a gear ratio; and
a power transmission mechanism configured to transmit power generated by the electric actuator to change the inclination angle of the movable swash plate of the hydraulic continuously variable transmission.
2. The work vehicle according to claim 1, further comprising: an inclination angle detection unit configured to detect the inclination angle of the movable swash plate at least while the engine is stopped.
3. The work vehicle according to claim 2, wherein:
the power transmission mechanism includes:

a first rotary plate coupled to the expansion/contraction part and configured to rotate about a rotation part based on expansion of the expansion/contraction part; and a trunnion arm coupled to the first rotary plate such that rotation of the first rotary plate rotates the trunnion arm; and rotation of the trunnion arm changes the inclination angle of the movable swash plate.

4. The work vehicle according to claim 1, further comprising:
a switch operation unit configured to perform a first operation to switch the hydraulic continuously variable transmission to neutral state; and
a switching operation detection unit configured to detect the first operation performed by the switch operation unit.

5. The work vehicle according to claim 4, wherein:
based on detection of the first operation being performed by the switch operation unit while the engine is stopped, the electric actuator is configured to change the inclination angle of the movable swash plate so that the hydraulic continuously variable transmission is in a neutral state.

6. The work vehicle according to claim 1, further comprising:
a body configured to support the engine; and
a traveling unit configured to move the body.

7. The work vehicle according to claim 6, wherein:
a potentiometer configured to detect an inclination angle of the movable swash plate,
the potentiometer is positioned higher than a center of the traveling unit relative to a vertical direction of the traveling unit.

8. The work vehicle according to claim 1, further comprising:
rear wheels; and
a rear axle; and
wherein at least a part of the electric actuator is positioned higher than a height of a center of the rear axle.

9. The work vehicle according to claim 1, further comprising:
the moveable swash plate; and
wherein:
the electric actuator is linearly movable between a first position and a second position to rotate a power transmission mechanism about a shaft; and
the electric actuator is electrically coupled to the battery and independently operable from the engine such that the electric actuator is moveable between the first position and the second position while the engine is stopped.

10. A system for operating a work vehicle, the system comprising:
a hydraulic continuously variable transmission configured to change an output of an engine, the hydraulic continuously variable transmission comprising a swash plate disposed at an inclination angle that corresponds to a gear ratio;
a power transmission mechanism coupled to the swash plate, the power transmission mechanism rotatable about a shaft such that movement of the power transmission mechanism changes the inclination angle of the swash plate; and
an electric actuator coupled to the power transmission mechanism, the electric actuator having a cylinder rod and a drive motor configured to move the cylinder rod between a first position and a second position to rotate the power transmission mechanism about the shaft; and
wherein the electric actuator is connected to a power source and independently operable from the engine such that the electric actuator is moveable between the first position and the second position while the engine is stopped.

11. The system according to claim 10, further comprising a potentiometer configured to detect the inclination angle of the swash plate.

12. The system according to claim 10, wherein a position of the electric actuator between the first position and the second position corresponds to the inclination angle of the swash plate.

13. The system according to claim 10, further comprising:
a potentiometer configured to detect the inclination angle of the swash plate; and
wherein the electric actuator includes:
a motor; and
an expansion/contraction part configured to expand and contract based on an output of the motor.

14. The system according to claim 13, wherein the potentiometer is positioned higher than a center of a traveling unit relative to a vertical direction of the traveling unit.

15. The system according to claim 10, further comprising:
a switch configured to select an operational state of the hydraulic continuously variable transmission, the switch operable between:
a first configuration in which the hydraulic continuously variable transmission operates in a neutral state;
a second configuration in which the hydraulic continuously variable transmission operates in an advance state; and
a third configuration in which the hydraulic continuously variable transmission operates in a reverse state; and
a controller configured to:
detect an operational state of the hydraulic continuously variable transmission; and
based on detection of the switch being in first configuration while the engine is stopped, the electric actuator is configured to change the inclination angle of the swash plate so that the hydraulic continuously variable transmission is in a neutral state.

16. The system according to claim 10, wherein the electric actuator comprises a first portion and a second portion arranged with respect to a center of an axle in a vertical direction such that the first portion is higher and the second portion is lower than the center.

17. The system according to claim 10, further comprising a controller configured to enable electric power from the power source to be provided to the electric actuator at least while the engine is stopped.

18. The system according to claim 10, wherein the electric actuator comprises:
a fixing plate;
a second member attached to the cylinder rod and disposed outside the cylinder rod so as to be movable relative to the cylinder rod to expand and contract the electric actuator; and
a protection boot covering the second member and the cylinder rod.

19. The system according to claim 10, wherein:
the power transmission mechanism is positioned between the hydraulic continuously variable transmission and the electric actuator;

the power transmission mechanism includes:
- a first rotary plate coupled to the cylinder rod and configured to rotate about a rotation part based on movement of the cylinder rod; and
- a trunnion arm coupled to the first rotary plate such that rotation of the first rotary plate rotates the trunnion arm; and rotation of the trunnion arm changes the inclination angle of the swash plate.

20. The system according to claim 10, wherein the hydraulic continuously variable transmission comprises:
- a hydraulic motor; and
- a hydraulic pump comprising the swash plate; and
- wherein a delivery rate of a working fluid changes as the inclination angle of the swash plate changes.

* * * * *